(12) United States Patent
Luciano, Jr. et al.

(10) Patent No.: US 10,639,529 B1
(45) Date of Patent: May 5, 2020

(54) BALL IDENTIFICATION ERROR ANALYSIS SYSTEM AND METHOD

(71) Applicants: Robert A. Luciano, Jr., Reno, NV (US); Warren R. White, Reno, NV (US)

(72) Inventors: Robert A. Luciano, Jr., Reno, NV (US); Warren R. White, Reno, NV (US)

(73) Assignee: EDGE TECHNOLOGY, Reno, NV (US)

( * ) Notice: Subject to any disclaimer, the term of this patent is extended or adjusted under 35 U.S.C. 154(b) by 0 days.

(21) Appl. No.: 15/707,337

(22) Filed: Sep. 18, 2017

(51) Int. Cl.
*A63B 60/46* (2015.01)
*A63B 37/00* (2006.01)
*A63B 47/00* (2006.01)

(52) U.S. Cl.
CPC ............ *A63B 60/46* (2015.10); *A63B 37/007* (2013.01); *A63B 47/002* (2013.01); *A63B 2220/05* (2013.01); *A63B 2220/12* (2013.01)

(58) Field of Classification Search
CPC ..... A63B 60/46; A63B 47/002; A63B 37/007; A63B 2220/12; A63B 2220/05
See application file for complete search history.

(56) References Cited

U.S. PATENT DOCUMENTS

| | | | | |
|---|---|---|---|---|
| 9,370,704 B2* | 6/2016 | Marty | ................ | G09B 19/0038 |
| 10,022,613 B2* | 7/2018 | Tran | ..................... | A63B 71/145 |
| 10,252,145 B2* | 4/2019 | Tran | ..................... | H04N 5/2257 |
| 2012/0052967 A1* | 3/2012 | Grieshaber | ........ | A63B 37/0003 |
| | | | | 473/155 |
| 2013/0274025 A1* | 10/2013 | Luciano, Jr. | ....... | A63B 69/3658 |
| | | | | 473/156 |
| 2018/0071599 A1* | 3/2018 | Kaspersky | ............. | A63B 60/46 |

* cited by examiner

*Primary Examiner* — Jeffrey S Vanderveen
(74) *Attorney, Agent, or Firm* — Kerr IP Group, LLC

(57) ABSTRACT

A ball identification error analysis system and method is described. The illustrative ball identification error analysis system includes a plurality of balls, a plurality of bays, and a plurality of targets. The plurality of bays is communicatively coupled to a tracking module. The tracking module is configured to determine a list of balls having a first probability of arriving at the target from the list of balls hit during the time period that have not been read by any one of the plurality of ball readers. The tracking module is further configured to determine a list of balls having a second probability of arriving at the target from the list of balls hit during the time period that have not been read by any one of the plurality of ball readers. The system associates the greater of the first probability and the second probability with hitting the target.

27 Claims, 26 Drawing Sheets

Figure 35

BALL IDENTIFICATION ERROR ANALYSIS SYSTEM AND METHOD

FIELD

The present disclosure relates to a ball identification error analysis system and method. More specifically, the disclosure relates to apparatus, systems, and methods that support ball identification error analysis in skill based games, games of chance and the combination thereof.

BACKGROUND

Golf has been a popular form of entertainment for many years, crossing many cultures. Recently, there has been interest in applying new technology to creating new entertainment variants of the game. In particular, driving ranges have become popular with as many as 100 or more "hitting bays" on multiple levels.

Traditionally, driving ranges were established to allow players to practice their golf game on an open field. During game play, a player strikes a golf ball at a flag placed some distance away and the player visually attempts to determine the landing position of the ball in relation to the flag. In view of the distance travelled by the golf ball, the relatively small size of the golf ball, weather and other such considerations, game play at a driving range has been limited to a singular and personal experience, in which the player could not compete with or play against other players in the driving range.

Recently, driving ranges have increased in sophistication and include targets and score-keeping equipment, which reward the player when the target is hit or when the golf ball lands near the target.

One method for tracking golf balls includes embedding Radio Frequency Identification Devices ("RFIDs") in golf balls used in the facility. These RFID golf balls have been encoded values that can be detected by a generated radio frequency and antenna. The RFID in the ball is associated with a player or a particular hitting bay before it is hit by the player. When the player uses an RFID ball that is hit into a target area, that particular ball RFID is detected at a target equipped with RFID detection devices. This enables electronic scoring of hits on particular targets and the determination of which player hit which target. This information can then be automatically detected by computer systems and used to score games that the player participates in. Other technologies that may be used in combination with, or instead of, RFID identification have also been suggested. These include the use of Doppler-radar, lasers, or one or more high-resolution cameras using computerized image analysis. Some of the aforementioned techniques are presently in use in commercial entertainment centers in the U.S. and overseas.

These developments in golfing and driving range experiences increase the players' entertainment and have been commercialized as a result. Thus, there continues to be interest in improving the players' experience and increase the players' engagement in the driving range experience. One method to increase player engagement and entertainment is to include a wagering option to the driving range experience.

However, a wagering system must have much higher levels of ball tracking accuracy and integrity than are required for an entertainment-only system. In a non-wagering system there is a low standard of precise ball identification required and a relatively high tolerance for error. Thus, the failure to properly identify and register a small percentage of balls at a target or target area may be tolerated up to some reasonable threshold.

In contrast, in a wagering system the cost of a wager and the potential to win monetary awards or other prizes of value reduce the tolerable level of error significantly. The reduced level of tolerable error derives from players' interest in their wager and potential winnings, game operators' interest in regulatory compliance and customer satisfaction, and governmental regulatory requirements. As the stakes of the wager increase, the tolerance for inaccuracy diminishes. Although there is some reasonable tolerance for very rare errors, i.e. slot machines are typically marked, "Malfunction voids all plays and pays," the error rate must be determined to be a miniscule fraction of a percent. Additionally, in the case of an error, it is typically required that players get refunds for any play cost in the event of a malfunction. Thus, gaming regulators can be expected to require extremely high levels of accuracy, including mechanisms that ensure players are never "cheated" and that the game performs precisely as represented.

Thus, a golf wagering system must overcome multiple concerns beginning with improved ball tracking accuracy that accounts for ball identification failure. Another significant problem that must be solved in such a wagering system is determining how to create games that allow players at many different skill levels to compete for prizes. This problem is significant because a system which allowed the best golfers to have an advantage in winning prizes will not attract the general public in a way required to achieve commercial success and may violate local regulations.

Thus, a golf game that includes a wagering element is desirable. Additionally, a golf wagering system which limits or removes any advantage attributable to a player's skill at golf is further desirable.

SUMMARY

A ball identification error analysis system and method is described. The illustrative ball identification error analysis method proceeds by reading a unique ID indicator of a ball with a first ball reader. The first ball reader is located at a hitting bay. A dispenser located at the hitting bay dispenses the ball. Then a tracking subsystem tracks a flight path of the ball. The tracking subsystem is communicatively coupled to a tracking module and the flight path corresponds to a plurality of probabilities. Each of the plurality of probabilities corresponds to a probability that the ball will strike a particular target. The illustrative method continues by detecting the ball at a target with a ball detector. Next, the tracking module retrieves a list of all balls hit during a time period. Then the tracking module determines a list of balls hit during the time period that have not been read by any one of a plurality of ball readers. The plurality of ball readers includes the first ball reader. Further, the list of balls hit during the time period that have not been read by any one of the plurality of ball readers includes more than one ball. Further still, the tracking module is further configured to determine a list of balls having a first probability of arriving at the target from the list of balls hit during the time period that have not been read by any one of the plurality of ball readers. The tracking module is further configured to determine a list of balls having a second probability of arriving at the target from the list of balls hit during the time period that have not been read by any one of the plurality of ball readers. In the illustrative method, the second probability is different than the first probability and the greater of the first probability and the second probability is associated with hitting the target.

The illustrative ball identification error analysis system includes a plurality of balls, a plurality of bays, and a plurality of targets. In the illustrative embodiment, each of the plurality of balls includes a unique ID indicator. Additionally, each of the plurality of bays includes a ball dispenser, a first ball ID reader. Further, each of the plurality of bays is communicatively coupled to a tracking module. The ball tracking subsystem determines a flight path of a ball. The determined flight path corresponds to a plurality of probabilities. Each of the plurality of probabilities corresponds to a probability that the ball will strike a particular target. In the illustrative embodiment, each of the plurality of targets include a ball detector and a second ball ID reader. Each of the ball detectors is communicatively coupled to the tracking module, and each second ball ID reader is communicatively coupled to the tracking module. In the illustrative embodiment, the tracking module is configured to retrieve a list of all balls hit during a time period when one of the plurality of targets detects a ball and the one target of the plurality of targets does not read the ID indicator of the ball. Further, the list of balls hit during the time period that have not been read by any one of the plurality of ball readers includes more than one ball. Additionally, the tracking module is further configured to determine a list of balls having a first probability of arriving at the target from the list of balls hit during the time period that have not been read by any one of the plurality of ball readers. The tracking module is further configured to determine a list of balls having a second probability of arriving at the target from the list of balls hit during the time period that have not been read by any one of the plurality of ball readers. In the illustrative embodiment, the second probability is different than the first probability and the greater of the first probability and the second probability is associated with hitting the target.

In another embodiment, the ball identification error analysis system includes a plurality of balls, a plurality of bays, a plurality of targets, and a list of balls that hit at least one of the plurality of targets. In the illustrative embodiment, each of the plurality of balls includes a unique ID indicator. Additionally, each of the plurality of bays includes a ball dispenser, a first ball ID reader, and a ball tracking subsystem. Further, each of the plurality of bays is communicatively coupled to a tracking module. In the illustrative embodiment, each of the plurality of targets include a ball detector and a second ball ID reader. Each of the ball detectors is communicatively coupled to the tracking module, and each second ball ID reader is communicatively coupled to the tracking module. The list of balls is associated with a predefined time period and the list of balls includes the unique ID indicator for each ball. In the illustrative embodiment, the tracking module is configured to retrieve a list of all balls hit during a predefined time period when one of the plurality of targets identifies that a detected ball has entered a target and the target ball reader is unable to read the ID indicator associated with the detected ball. Further, the list of balls hit during the predefined time period is compared to a list of balls read by one of the targets. In the illustrative embodiment, a detected ball has not been read by one of the target ball readers and the system associates the detected ball with the unique ID indicator that has not been associated with another ball in the list of balls that hit at least one of the targets.

In a further embodiment, the ball identification error analysis system includes a plurality of balls, a plurality of bays, and a plurality of targets. In the illustrative embodiment, each of the plurality of balls includes a unique ID indicator. Additionally, each of the plurality of bays includes a ball dispenser, a first ball ID reader, and a ball tracking subsystem. Further, each of the plurality of bays is communicatively coupled to a tracking module. The ball tracking subsystem determines at least one parameter describing the flight path of a ball. The flight path corresponds to a plurality of probabilities, and each of the plurality of probabilities corresponds to a probability that the ball will strike a particular target. In the illustrative embodiment, each of the plurality of targets include a ball detector and a second ball ID reader. Each of the ball detectors is communicatively coupled to the tracking module, and each second ball ID reader is communicatively coupled to the tracking module. In the illustrative embodiment, the tracking module is configured to retrieve a list of all balls hit during a predefined time period when one of the plurality of targets identifies that a detected ball has entered a target and the target ball reader is unable to read the ID indicator of the ball. Further, a ranked list of balls is calculated, in which list each ball has an associated probability of hitting the specified target. This error analysis enables a determination that associates the detected ball with a most likely ball to enter the target.

In still another embodiment, the ball identification error analysis system includes a plurality of balls and a plurality of bays. In the illustrative embodiment, each of the plurality of balls includes a unique ID indicator. Additionally, each of the plurality of bays includes a ball dispenser, a first ball ID reader, and a ball tracking subsystem. The ball tracking subsystem determines at least one parameter describing the flight path of a ball. The flight path is associated with a plurality of probabilities, and each of the plurality of probabilities corresponds to a probability that the ball will strike a particular target. In this illustrative embodiment, the probability of each ball hitting a given target is recalculated periodically based upon a history of ball hits and a history of targets hit.

FIGURES

The present subject matter will be more fully understood by reference to the following drawings which are presented for illustrative, not limiting, purposes.

Figure 35:
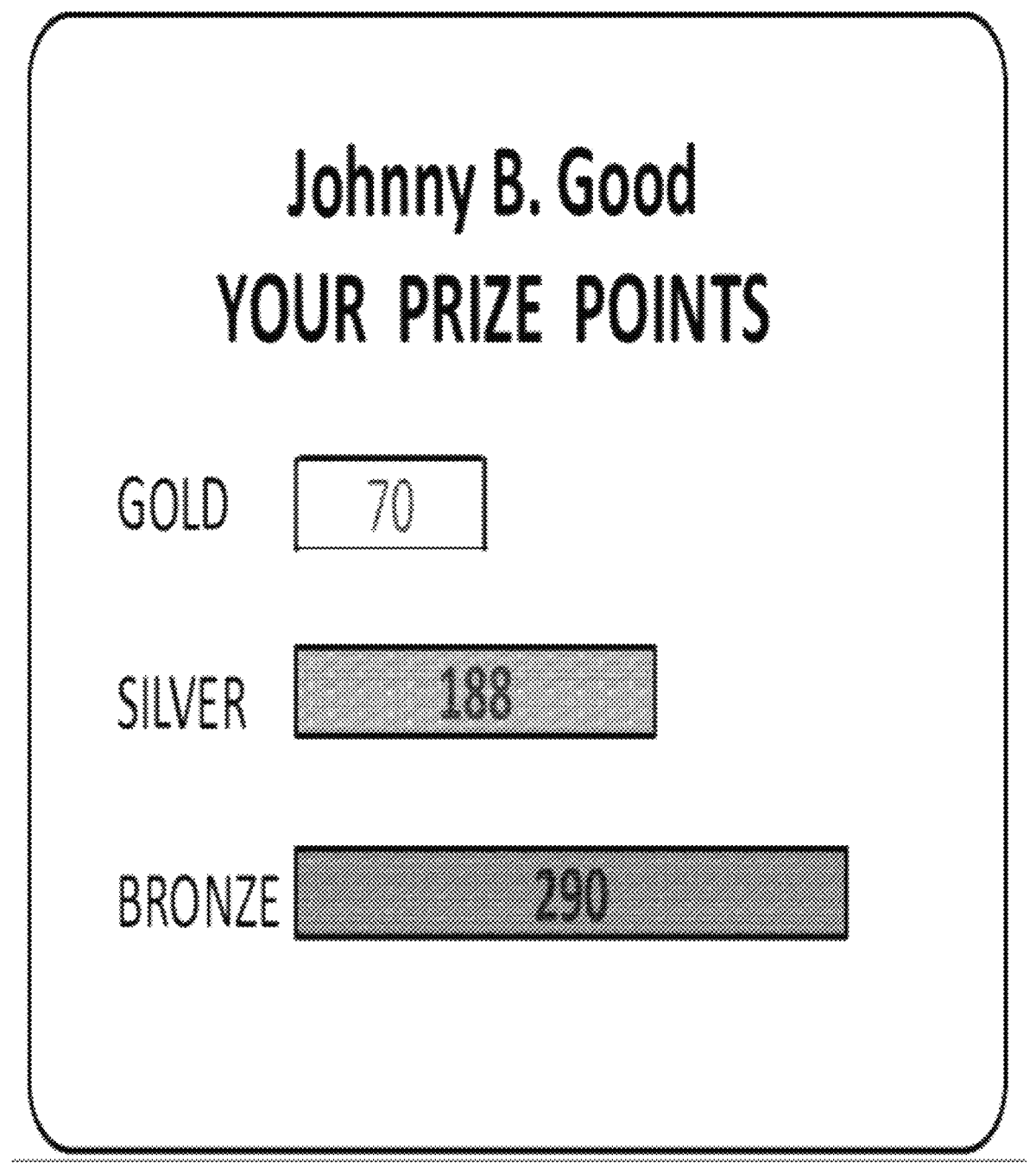

FIG. 35 shows an enlarged view of the illustrative player point score presentation.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. The following detailed description of the illustrative embodiments includes reference to the accompanying drawings, which form a part of this application. The drawings show, by way of illustration, specific embodiments in which the subject matter disclosed herein may be practiced. It is to be understood that other embodiments may be utilized and structural changes may be made without departing from the scope of the claims.

The ball identification error analysis and golf game wagering system and method described herein provide greater flexibility, and support more complex games of chance, games of skill and the combination thereof. The illustrative embodiments described herein provide an entertaining format for players to exercise their golf skills to earn an opportunity for a bonus wagering game. In some embodiments, the player is only charged for a wager upon striking a target. In one embodiment, the particular target or target area struck by a player determines the type of wagering game the player earns an opportunity to play. In another embodiment, the particular target or target area struck by a player determines the pay-table of the wagering game the player earns an opportunity to play. In a further embodiment, the golf wagering system provides wagering games randomly or according to a number of balls struck by a particular player. In a still further embodiment, the golf wagering system utilizes a ball identification error analysis method that dramatically reduces the number of unidentifiable balls experienced by the system and thereby increases the precision and accuracy of the ball tracking subsystem.

Illustrative games of skill include, but are not limited to, hitting a baseball in a cage, a game of darts, a bowling game and other such games of skill. With respect to games of chance, the wagering system disclosed herein may be applied to games of chance such as class II slot machines, class III slot machines, keno games, card games, bingo games, pull-tab games and other such games of chance.

Figure 1:
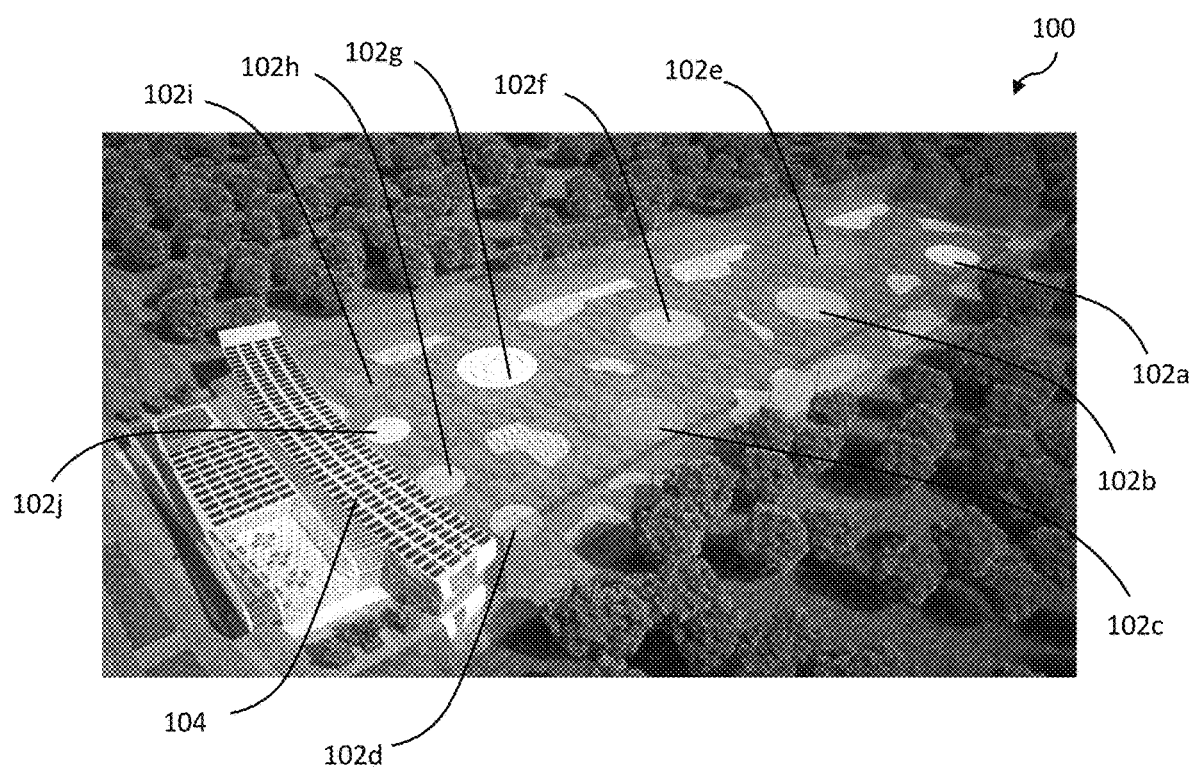
FIG. 1 shows a golf driving range facility with a multi-tiered hitting bay structure and ball tracking targets.
Figure 2:
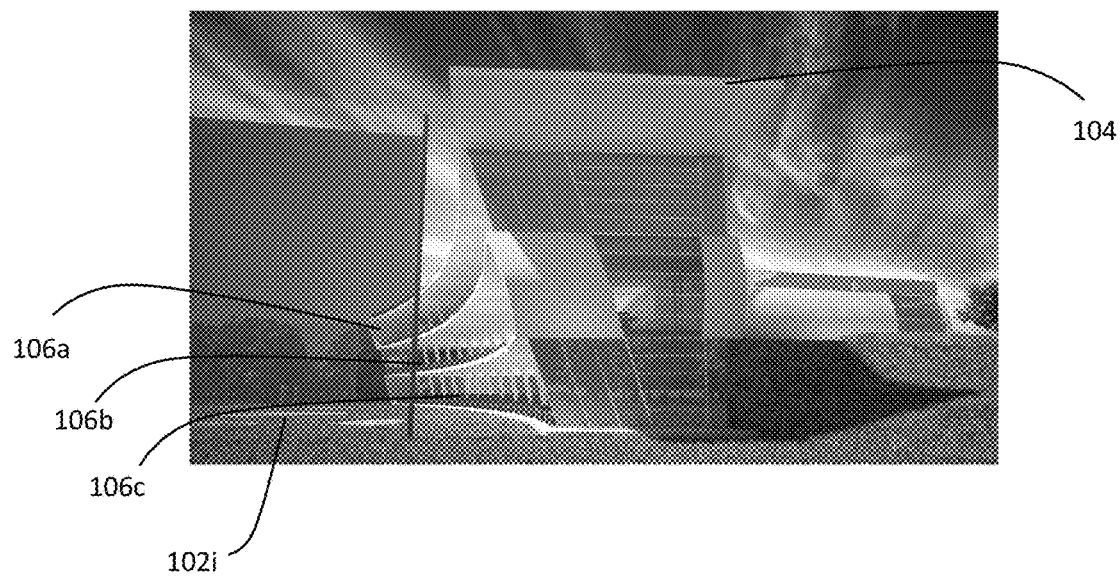
FIG. 2 shows a left side perspective view of the multi-tiered hitting bay.

Referring to FIG. 1 there is shown a golf driving range 100 with multiple targets 102 capable of tracking balls received at the targets 102. In the illustrative embodiment, the driving range 100 includes a multi-tiered building 104 or structure housing a plurality of hitting bays, from which players interact with the herein described golf wagering system and method. The multiple tiers 106 of the hitting bay building 104 are viewed from the left-side in FIG. 2.

Figure 3:
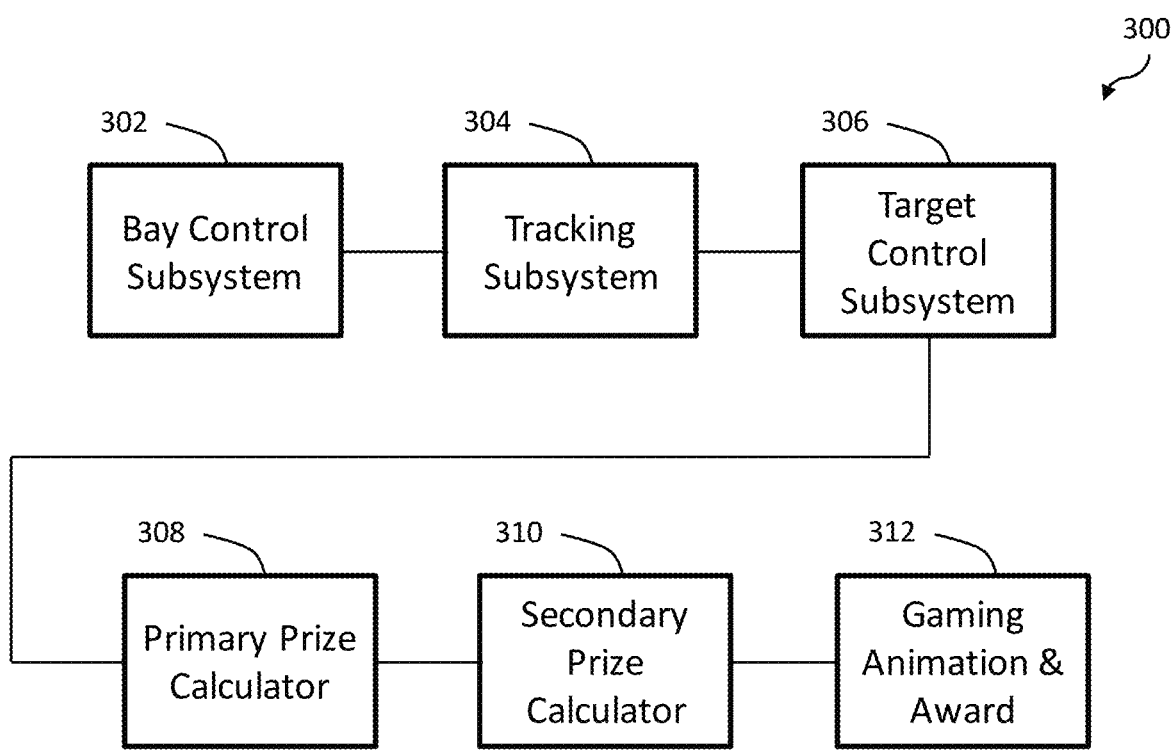
FIG. 3 shows a flow chart of the fundamental elements of the golf wagering system and method.

Referring now to FIG. 3, there is shown a modular depiction of the golf wagering system 300 including a bay control subsystem 302, a tracking subsystem 304, a target control subsystem 306, a primary prize calculator 308, a secondary prize calculator 310, and a gaming animation/award 312. A game session facilitated by the golf wagering system begins through player interaction with the bay control subsystem 302. The bay control subsystem 302 controls aspects of the player hitting a ball, including the dispensing of the ball and the management of the interaction between the player and the wagering system, such as verification of a player ID and funds prior to playing a wagering game, as well as dispensation of uniquely identifiable golf balls.

After a ball is hit by a player, the tracking subsystem 304 is responsible for identifying the ball flight path and assuring the relationship between the player and the ball is maintained so when the ball arrives at a target the player who hit the ball can be identified with certainty. The tracking subsystem 304 may operate by employing a variety of technologies including RFID scanning, Doppler radar tracking, laser distance determination, and other optical sensing devices, singly or in combination. The tracking subsystem 304 communicates with the target control subsystem 306 to identify balls arriving at a target 102. In operation, the tracking subsystem 304 includes a variety of sensor and identification devices, which perform in concert to associate balls arriving at a target 102 with a hitting bay 106 from which a particular player struck the ball.

The target control subsystem 306 determines the play result including whether a target 102 has been hit, whether the ball lands within a certain proximity to a target 102, and processes the balls for recirculation, rejection, and special treatment. The target control subsystem may vary according to the type or configuration of the target 102.

The primary prize calculator 308 determines a primary prize that a player will receive for the target strike attempt based on the play result determined by the target control subsystem 306, which may include a null prize, a fixed prize, or a progressive prize. In this manner, the primary prize calculator 308 determines a primary game result. Included within the determination of the primary game result is the determination of a secondary game.

Next, the secondary prize calculator 310 may determine the result of a specific game of chance. The secondary prize calculator 310 engages upon a triggering event, typically the award of a primary prize from a target strike. The triggering event may also include a random selection event or a scheduled routine event. The game of chance may be specified from one or more of a primary game result and a player selection. Each game of chance has an associated pay-table determined by the primary game result. The game of chance result is determined through operation of a Random Number Generator ("RNG") one or more times. The particular pay-table employed in a game of chance is a predetermined relationship between various prize possibilities and the associated probabilities of those results occurring.

The final stage of a game session facilitated by the golf wagering system is a game result animation and prize award 312. The animation and prize award 312 include announcing and presenting to the player in an entertaining manner the primary and secondary prizes. The animation and prize award 312 also include updating the player's account status to reflect any winnings that the player may have achieved.

Figure 4:
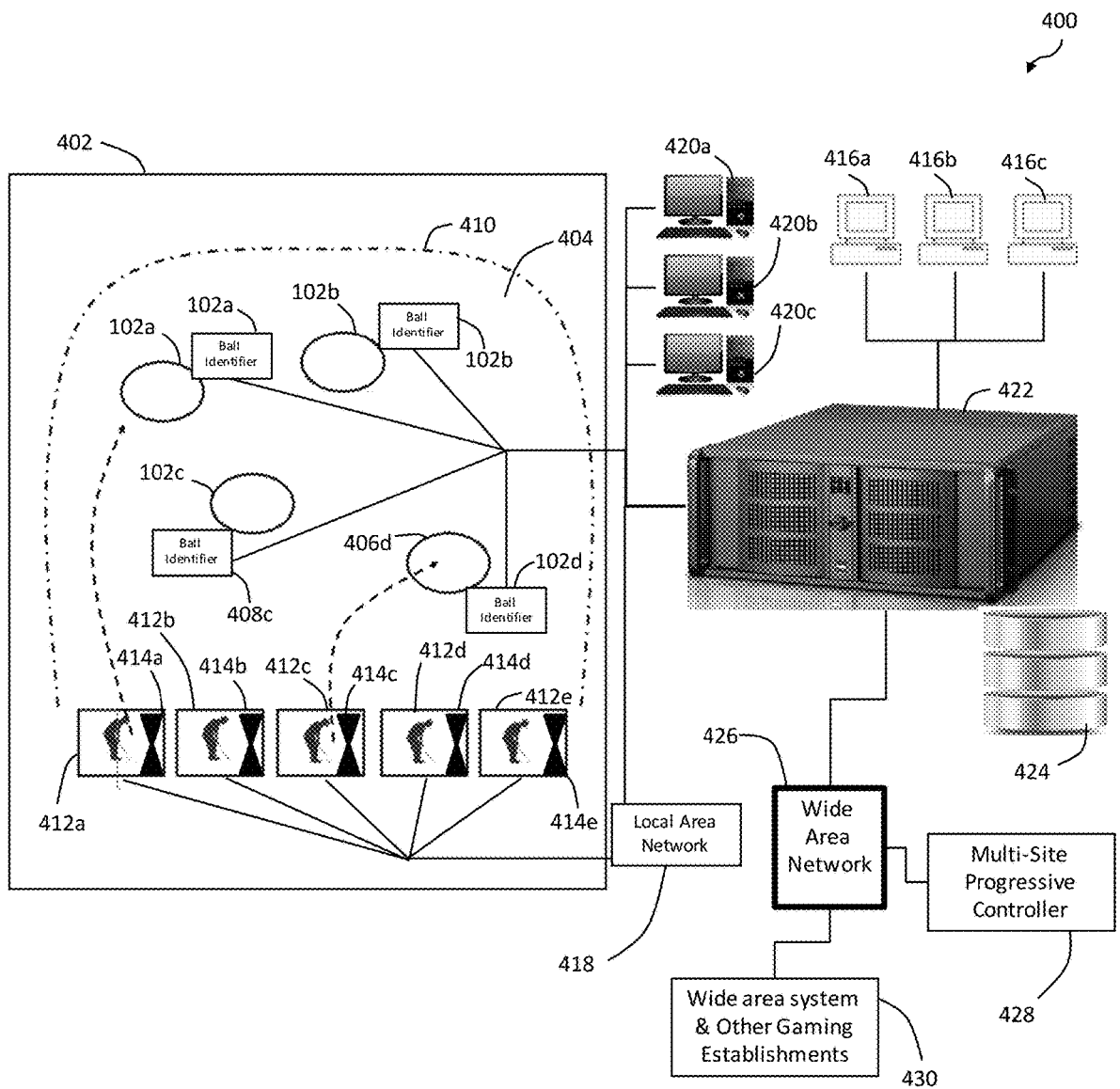
FIG. 4 shows a golf wagering system comprising a driving range with targets and the computing infrastructure supporting the golf wagering system.

Referring now to FIG. 4, there is shown a golf wagering system 400 implemented at a driving range 402. The golf wagering system 400 includes a plurality of golf balls (not shown) each having at least one unique identification indicator, a target range 404 including one or more targets 102 each with an associated ball identifier module 408, a netting enclosure 410 surrounding the target range 404, one or more hitting bays 412 each with an associated player interface unit ("PIU") 414, and one or more point-of-sale ("POS") stations 416. The golf wagering system 400 is supported by a local area network ("LAN") 418 communicatively coupling the targets 102, the hitting bays 412, the POS stations 416, one or more management terminals 420, and a server 422. The server 422 includes a database 424 for tracking ball hits and target activity. The server 422 is communicatively coupled through a wide area network ("WAN") 426 to a multi-site progressive controller 428.

By way of example, the illustrative targets 102 are disposed within an enclosed target range 404 that includes an illustrative netting 410, a wall or other suitable barrier that prevents an errant golf ball from causing damage outside the property. Additionally, the illustrative netting 410 prevents golf balls from entering the target range 404 from outside the boundary established by the illustrative netting 410 or wall.

The golf balls include at least one unique identification indicator, which may be embodied as an RFID chip and antenna embedded in the golf ball. The unique identification indicator may also be embodied as a color, a printed bar code, a printed QR code, or other such identifier that corresponds to the unique identification indicator. Additionally, the golf ball may include one or more unique identifiers that may be electronically generated and operate in a manner similar to the RFID golf ball.

At least one of the illustrative targets 102 include a ball identifier module 408, represented by ball identifier modules 408*a*, 408*b*, 408*c*, and 408*d*, that identifies the unique identification indicator corresponding to a golf ball. By way of example and not of limitation, the golf ball may include an RFID component that wirelessly transmits the unique identifier, and the ball identifier module 408 is an RFID reader configured to read the unique identification indicator transmitted by the RFID golf ball. In various embodiments, the ball identifier module 408 is a QR reader, a bar code reader, an optical scanner, or any combination thereof. The ball identifier modules 408 operate as an element of the tracking subsystem 304, which accurately identifies golf balls at the hitting bays 412, at the targets 102, and associates balls received at the targets 102 with the hitting bay 412 from which the balls were struck and the player who struck the ball.

The illustrative golf wagering system 400 supports communications between the server 422, the database 424, the bay control subsystem 302, the tracking subsystem 304, and the target control subsystem 306 that enable the coordination of events and recording of information relating to the player, play selections, identification of golf balls, game play states, game play results, and player accounting. The server 422 also communicates with other system components as described in further detail below.

The LAN 418 supports communication between the various components of the golf wagering system 400, such as the POS stations 416, the PIUs 414, the hitting bays 412, the ball identifier modules 408, and the management terminals 420. The illustrative POS stations 416 may be manned cashier stations, unmanned electronic kiosks for setting up player accounts, or other systems and methods for collection of play funds that can be used by the player and redemption of prizes by the player. Some of these processes may also be accomplished through the PIUs 414 in each illustrative hitting bay 412. The PIU 414 is described in further detail below in FIG. 5. The management terminals 420 are connected via the LAN 418 to the server 422 in order to manage game configurations, control system operation, and provide financial and other data related to golf system operations.

The management terminals 420 are communicatively coupled to the PIUs 414. Each PIU 414 allows the player to select game types, the denomination of wagers the player wishes to engage in and other characteristics of game play. The ball identifier modules 408 within the targets 102 allow a struck ball to be identified using RFID or another unique ID indicator with a particular player, and stores the ball identification in the database 424. The server 422 associates the uniquely identified ball with the player who struck the ball and a particular hitting bay 412 from which the uniquely identified ball was hit.

The management terminals 420 may be used by authorized personnel to manage facility operation, configure the systems, monitor operations and access other functions required to support features of the golf wagering system 400. Any player may also access their account to redeem values that were previously won or deposited. The targets 102 may include one or more sensors (not shown) that are used in a mechanical randomization process to detect the actions of a mechanical randomizer and/or ball and report the result to the server 422, the PIU 414, or any combination thereof.

In various embodiments, the golf wagering system 400 is communicatively coupled to a multi-site progressive controller 428 via a WAN 426, e.g. the Internet. Progressive prizes are prizes that grow in real time as a function of game play. Progressive prizes often accumulate prizes from multiple locations. The multi-site progressive controller 428 supports multi-venue progressive games or access to other gaming establishments 430 that include common prizes. For example, a common prize may include a pari-mutuel game of skill that is commonly played by players from different gaming facilities.

The multi-site progressive controller 428 works in a manner similar to WAN progressive systems currently in widespread use for gaming machines in Nevada and other jurisdictions throughout the United States and around the world. In one embodiment, a worldwide golf progressive jackpot is enabled, in which progressive controller 428 on a multi-jurisdictional system is enabled to handle play and prizes at multiple sites and/or in multiple currencies.

In some embodiments, a progressive prize can be set up so that very large prizes can be established as a function of play by multiple players either in the same or multiple facilities. A progressive prize is one that grows in real-time. The progressive prize may grow as a function of game play, game winnings, time or one or more other formulas. In that way, a very large prize value can be offered, which will grow in time and cause increasing levels of player excitement and increased play.

By way of example and not of limitation, the golf wagering system 400 is configured to interface and communicate with enterprise systems over the LAN 418 or the WAN 426 that provide additional services such as ordering systems for food and beverage establishments, enterprise resource planning systems, and other such technologies. In one embodiment, a player may select these additional services through the PIU 414 in the player's hitting bay 412.

Figure 5:
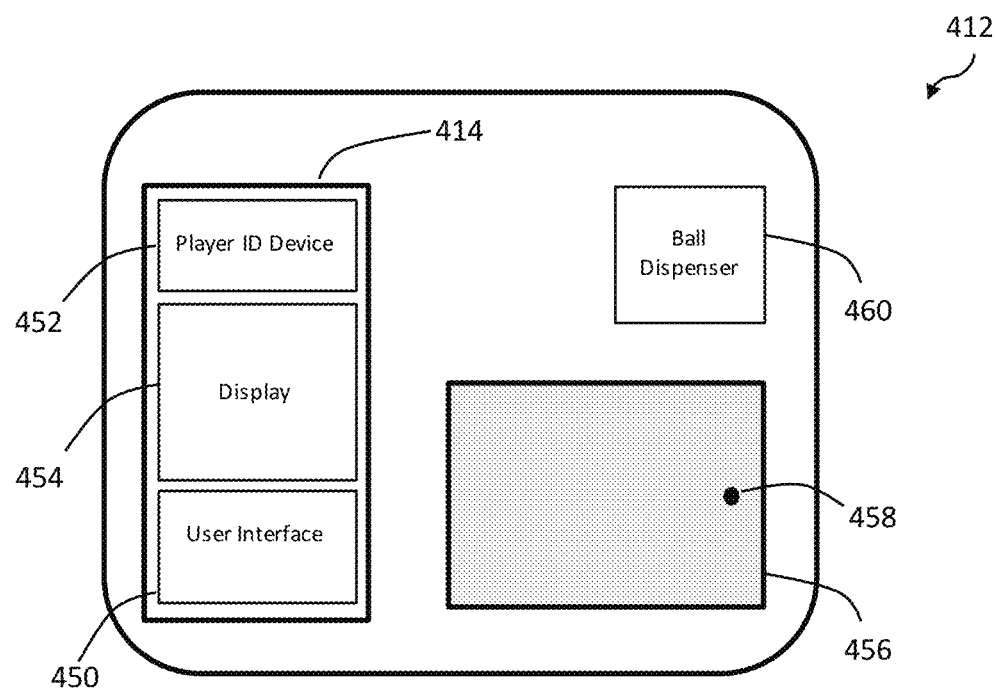
FIG. 5 shows a hitting bay and the associated elements of the hitting bay.

With reference to FIG. 5, the illustrative hitting bay 412 includes a mat 456 having a tee area 458 from which the golf ball is struck by the player, a ball dispenser 460, and a PIU 414 having a user interface 450 capable of receiving user input, which can be one or more of touch-screens, keypads, motion-sensing devices or personal computing devices.

The PIU 414 also includes a player identification device 452 which identifies the player to the golf wagering system 400. The player identification device 452 may identify the player with the use of at least one of a bar code reader, a magnetic stripe reader, a NFC reader, a QR code, or other such mechanism associated with personal computing devices, e.g. a mobile device. The PIU 414 may also include a display 454 that displays an illustrative game outcome or other such display information.

Figure 6:
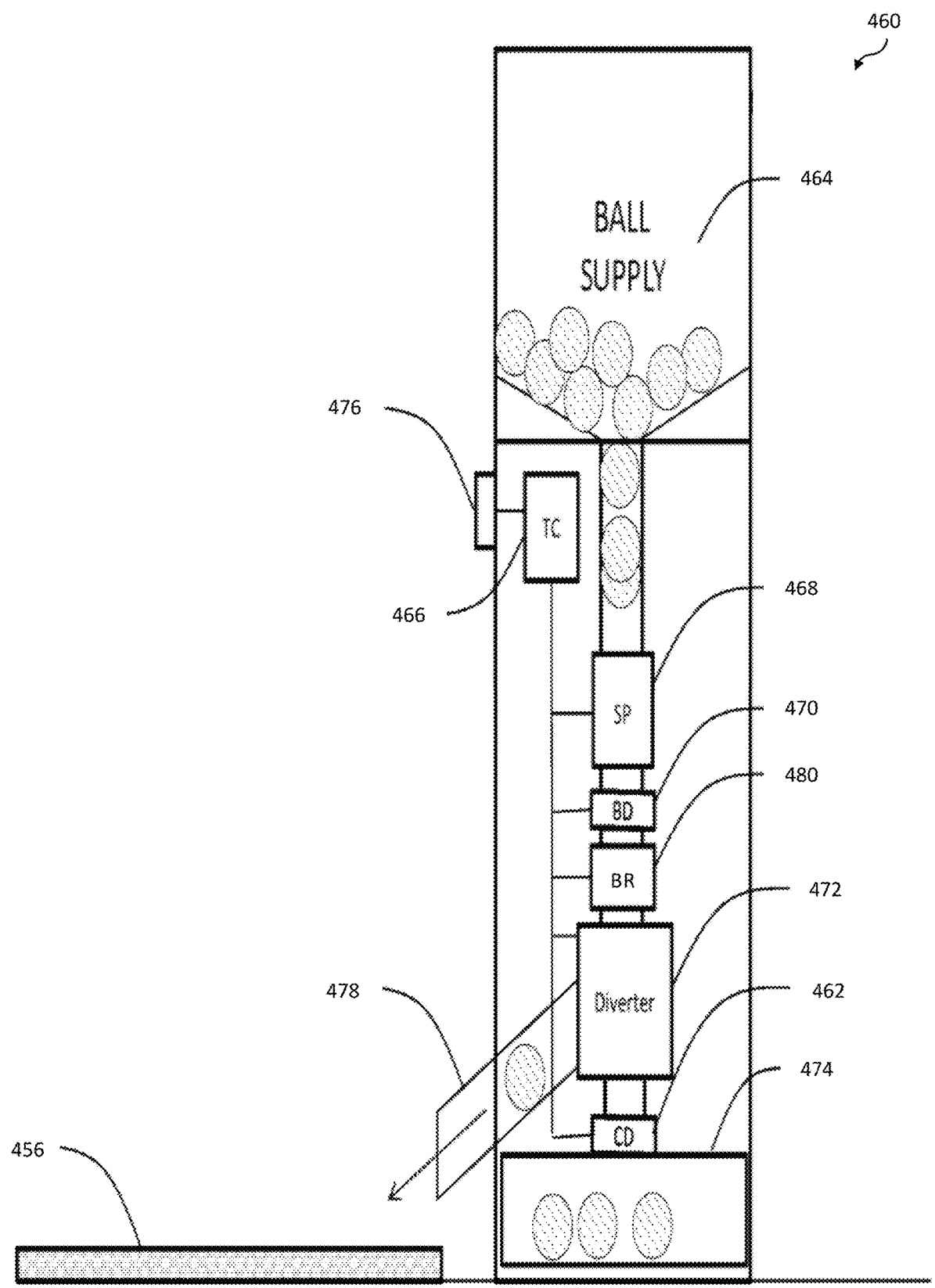
FIG. 6 shows a detailed view of an illustrative ball dispenser.

With reference now to FIG. 6, the ball dispenser 460 dispenses golf balls to the mat 456. The ball dispenser 460 verifies the unique ball identifier for each ball to be dispensed, to confirm that dispensed balls have a readable identification indicator and communicate the applicable identifier to a bay computing device 462, which may be embodied as a server, a virtual server, a client, a peer computing device, a controller, a control system, a field programmable gate array, and other such computing devices. In various embodiments, a ball reader 480 verifies the unique ball identifier for each ball to be dispensed, and confirms that dispensed balls have a readable identification indicator. The ball reader 480 may be an RFID scanner, a QR reader, a bar code reader, or other such optical scanning device.

In various embodiments, the ball dispenser 460 receives golf balls from a ball supply 464. The golf balls may be either hand-loaded, loaded through a conveyor, loaded with a vacuum system or other such loading system. The ball dispenser 460 is activated by a player initiating a game session at the PIU 414. In one embodiment, the dispensing of the ball may be authorized when the player's identification and that the player has funds sufficient for game play are verified.

The ball dispenser 460 may be communicatively coupled to a tee controller 466, e.g. a microprocessor, that activates a single-pass device 468 that allows a single ball to leave the ball supply 464 and pass a ball detector 470. The illustrative ball detector 470 includes an optical sensor that confirms to the tee controller 466 that a ball has been dispensed by the single-pass device 468. In various embodiments, other sensors capable of confirming the presence of a golf ball may be employed.

The ball reader 480 then proceeds to read the ball that has passed the ball detector 470. The ball reader 480 reads the unique identifier corresponding to a particular golf ball as the ball passes through the ball reader 480 and communicates the read identifier to the tee controller 466, and thereby to the server 422, which updates the database 424.

If the tee controller 466 receives the ball identifier from the ball reader 480, then the tee controller 466 activates a diverter 472. The diverter 472 transfers the golf ball down a dispensing chute 478 onto the mat 456, where the ball can be hit by a player.

If the ball reader 480 fails to identify the golf ball, then the diverter 472 routes the unidentified golf ball to a failed ball holder 474 for balls. Balls in the failed ball holder 474 are periodically collected and removed from the system. In various embodiments, the golf wagering system 400 further includes a capacity detector 476. The capacity detector 476 may include one or more optical sensors that detect an "overfull" ball holder 474. The capacity detector 476 is communicatively coupled to the tee controller 466, and the tee controller 466 will deactivate the ball dispenser 460 until the overfull ball holder 474 is corrected.

Communication between elements within the hitting bays 412 is facilitated by the secure LAN 418. In various embodiments, the computer server application may be located within the hitting bay 412. In other embodiments, the computer server application may be in a separate location. In still other embodiments, a Global Positioning System ("GPS") hardware component is located within the bay 412. The GPS hardware component communicates the bay location to the server 422, which provides real-time confirmation of the facility configuration.

GPS enabled devices and related positioning technologies are associated with the targets 102 and hitting bays 412. By way of example and not of limitation, GPS may be used in large facilities where there may be a significant difference in distance from one bay to another with respect to hitting a given target. Location technologies may also be important at sites where the targets 102 and/or the hitting bays 412 are mobile. For a mobile target, it is imperative to have accurate distance measurements and corresponding time stamps, which can be an important factor in a case of validating the integrity of one or more large prize hits.

For example, if multiple golf wagering facilities offer a large progressive prize for a hole-in-one target, a minimum distance from tee-to-target would be required for each wagering golf facility. GPS validation of distance may be one requirement to validate the player, the golf ball, and associate the player with a winning golf ball hitting the target 102.

GPS technologies may also be used with prize schemes where the prize payout is a function of the distance from the tee to the target 102. GPS technologies may be used to calculate the tee-to-target distances in real time, which would make such a prize system easy to create and administer because the prize system would automatically adjust for the different distance to a given target 102 from any of the various tees 458 or hitting bays 412, as well as automatically compensate for target 102 and/or tee 458 movement.

The hitting bay 412 is logically associated with the ball tracking subsystem 304, which may include various ball tracking devices, although some elements of the ball tracking subsystem 304 may be outside the physical confines of the hitting bay 412. There are a number of ball tracking methods and devices that can be used in the illustrative golf wagering system 400. By way of example and not of limitation, Doppler radar may be used to capture the ball flight, including speed, direction, angle of inclination, and ball spin. Other illustrative ball tracking systems include video and laser technologies, as well as the dual-matrix apparatus and method described herein.

Ball tracking occurs in a three step process. The first step is to monitor the impact of the ball at the hitting bay 412 and the initial trajectory of the ball as it is struck and leaves hitting bay 412. The second step is to monitor the flight path of the ball. This is important in some systems to measure "hook" and "slice" to accurately gauge where a ball will land. And the third step is monitoring the impact at the end of the shot when the ball lands, including the target 102 and/or any target area at which a ball actually lands.

Different embodiments may use some or all of these ball tracking devices and methods to achieve a required degree of accuracy in identifying the balls hit, the players that hit them, and where the balls landed.

Figure 7:
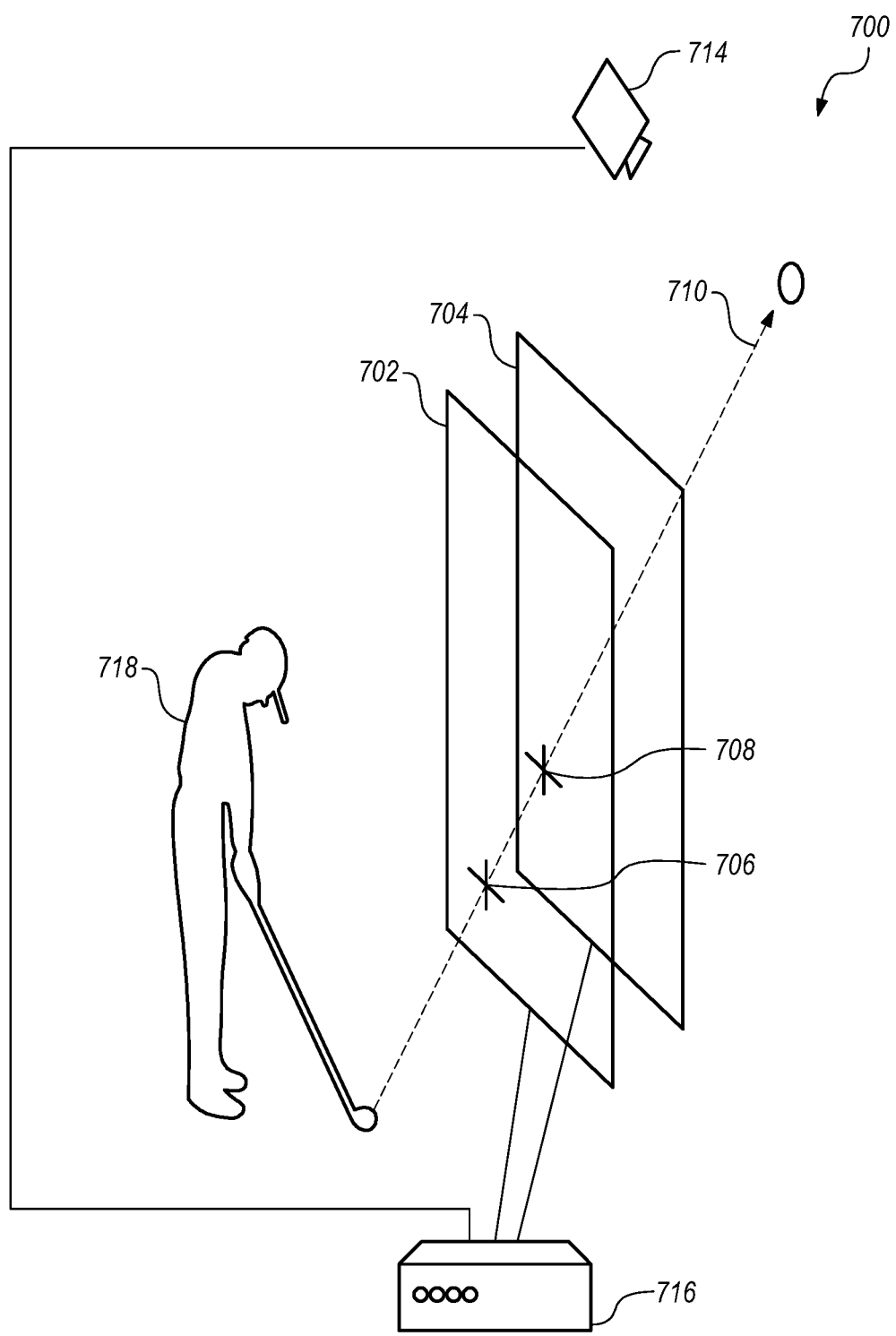
FIG. 7 shows an illustrative ball tracking system referred to as a dual matrix ball tracking system and method.

In one embodiment, the ball tracking subsystem 304 may include a dual matrix ball tracking apparatus and method. With reference now to FIG. 7, the illustrative dual matrix ball tracking system 700 increases the reliability of entertainment golf games by providing improved confirmation of the ball being hit and increased accuracy when tracking the ball's flight towards a target. The dual matrix tracking system 700 confirms the identification of a golf ball by reading an RFID or other unique identifier imbedded in the golf ball before a player 718 hits the ball. The precision of the tracking subsystem 304 can be improved by confirming the time that the golf ball was hit, and further, determining the direction and speed of the ball, as well as where the ball has landed.

The illustrative dual matrix ball tracking system 700 includes two optical sensor frames 702 and 704 that are located in front of where the golf ball is to be struck, i.e. at the front of the hitting bay 412. By way of example and not of limitation, each of the sensor frames 702 and 704 has an array of LED emitters and sensors that can detect the presence of an object within the frames 702 and 704. Such frames 702 and 704 may be similar to devices such as the ShadowSense 81 manufactured by Baanto International Ltd. of Missisuaga, Ontario. By utilizing two such frames 702 and 704, knowing the time and X-Y coordinate 706 and 708 of passage through each frame 702 and 704 it is easy to calculate the speed and direction of the ball. The direction of the ball may be used to calculate a ball flight path 710.

A device controller 716, that is an element of the ball tracking services module, receives the time the ball passes through each of the sensor frames 702 and 704 and receives the X-Y coordinate 706 and 708 of the passage. The device controller 716 then accurately determines the speed, direction and angle of inclination of the golf ball. In one embodiment, the frame sensors operate sufficiently fast that multiple scans of the golf ball passing through one or more of the matrices 702 and 704 are obtained. If obtained sufficiently fast, this allows measurement of speed and direction from a single frame. When that information is gathered from two frames 702 and 704, then it is possible to examine differences between the speed and direction as measured by each of the two frames 702 and 704 and enable the calculation of additional characteristics, including "slice" and "hook," which are deviations in the flight path 710 of the ball caused by the spin characteristics imparted by the impact of the golf club on the ball. This enables a projection of the ball's flight path 710.

In other embodiments, the tracking subsystem 304 may further include a high-definition camera 714 positioned to monitor the flight of the ball out of the hitting bay 412. The high-definition camera 714 is communicatively coupled to the device controller 716. Analysis of the camera video provides another tool for refining the estimation of the flight path 710 based on observed "hook" and "slice." From this information it is possible to correlate a potential arrival time on a target 102 with an actual target hit, even if the ball that hit the target 102 does not have its RFID read correctly. It is also possible to classify the ball flight path 710 in one of several ways so that the projected path information can be used to analyze all the golf balls in flight at the time of a target hit and make intelligent decisions on which ball hit what target 102.

Figures 8, 9:
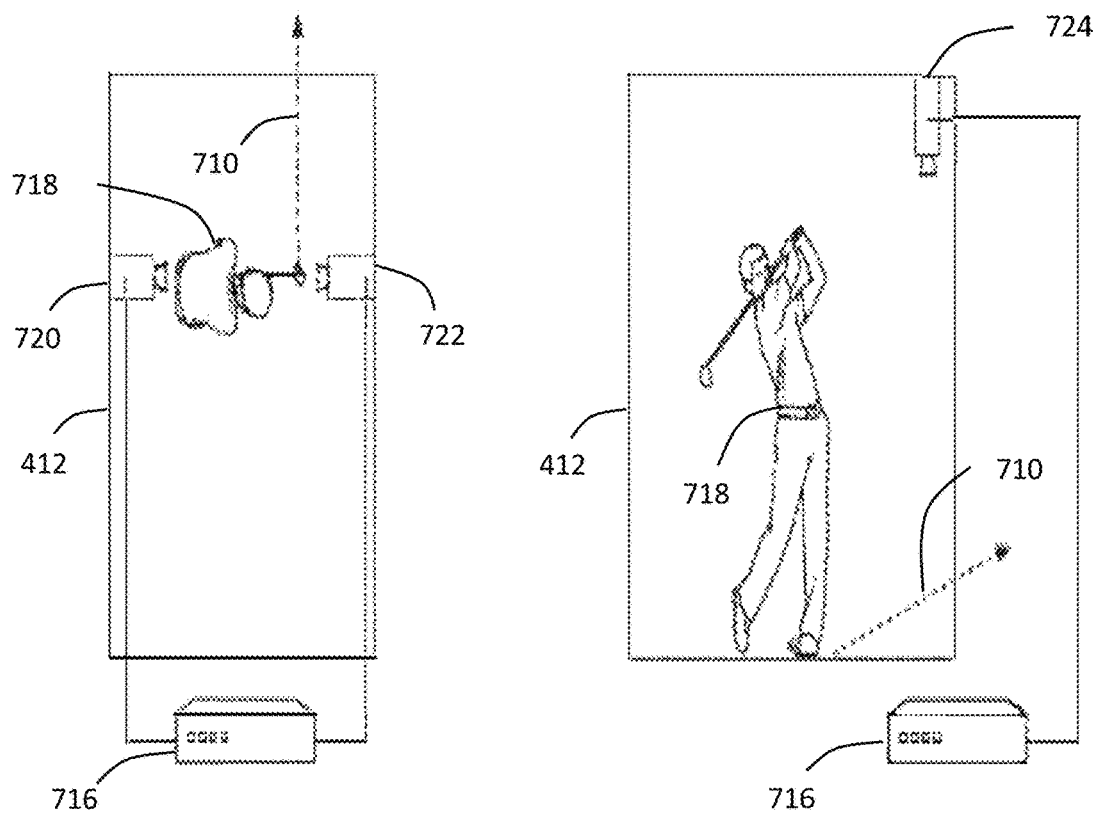
FIG. 8 shows another illustrative ball tracking system incorporating cameras behind and facing the player.
FIG. 9 shows another illustrative ball tracking system incorporating a camera above the player.
Figure 10:
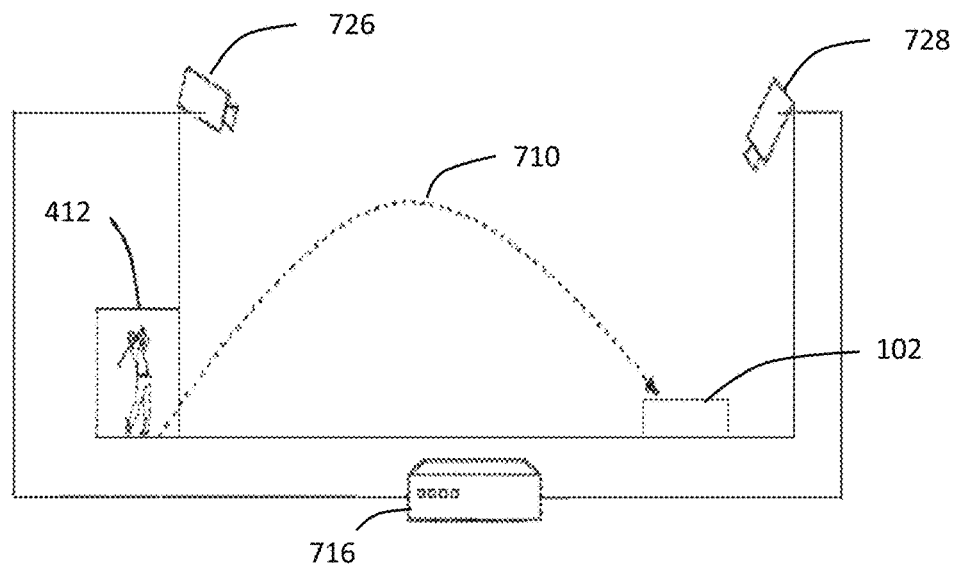
FIG. 10 shows another illustrative ball tracking system incorporating cameras mounted on the hitting bay and at the target.

With reference now to FIGS. 8, 9, and 10, there is shown a further embodiment wherein multiple video cameras 720, 722, 724, 726, and 728 provide sufficient resolution, picture quality, and state-of-the-art software analysis of video images to provide a comprehensive system for tracking a ball from tee-to-target by integrating multiple video images, or, alternatively, combining those images with other detectable measurements or events. In an embodiment including the cameras 720, 720, 722, 724, 726, and 728, the cameras capture the 3 stages of a golf ball's path from hitting bay 412 to target 102. Multiple cameras 720, 722, 724, 726, and 728 can be placed in and around the hitting bays 412 to provide a clear video image of the balls that are struck, even if some camera angles are blocked. Referring now to FIG. 8, a camera 722 viewing the ball from in front of a right-handed golfer 718 would be blocked if the golfer 718 were a left-handed golfer and put his body between the golf ball and camera 722. However, camera 720 would view the ball from in front of the left-handed golfer.

The ball tracking services module 304 analyzes the various camera images and records, minimally, the time that the ball is struck, the speed of the ball leaving the hitting bay 412, and the angle of horizontal inclination. With reference now to FIG. 9, there is shown a further embodiment wherein a camera 724 is placed overhead of the golfer 718 and golf ball. Such an overhead camera 724 is capable of recording the left-to-right angle of a hit. The overhead camera 724 may also be able to make a determination of any left or right turning of the trajectory, i.e., "hook" or "slice," that results from ball spin.

Referring now to FIG. 10, after the ball has left hitting bay 412, one or more overhead cameras 726 positioned above the hitting bays 412, will have a separate and distinct opportunity to capture the path 710 of the ball and, with a wider view than any of the cameras 720, 722, and 724 in the hitting bays 412, specifically to capture any left or right turning in the trajectory, i.e., "hook" or "slice." The ball tracking subsystem 304 is capable of recording the time of the ball leaving the hitting bay 412, the speed of the ball and the ball trajectory 710. From this information, a likely destination target or targets 102 can be determined.

Using time and angle measurements from all cameras employed in any particular embodiment, the ball tracking subsystem 304 can integrate the factors and produce an accurate record of each ball hit, its flight trajectory 710, and what target 102 was hit or whether any target 102 was hit.

In some embodiments, the ball tracking subsystem 304 analyzes the location of balls on a tee 458 before the ball is hit, and tracks a multiplicity of balls, each potentially with a known RFID value. In so doing, the ball tracking subsystem 304 provides positive confirmation of which ball was on the tee 458 at the time the ball was struck.

Figure 11:
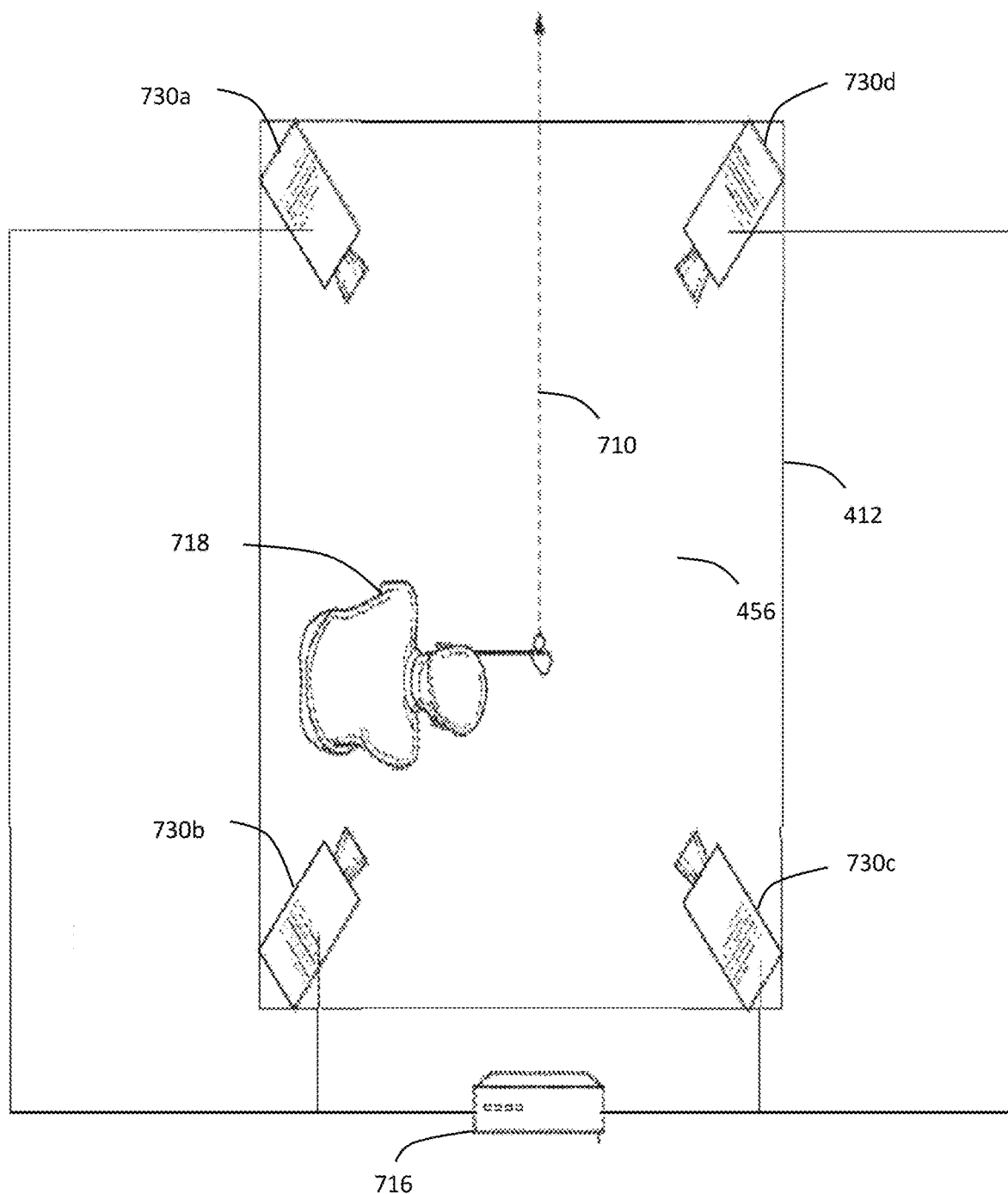
FIG. 11 shows another illustrative ball tracking system incorporating a plurality of infrared cameras mounted so that the cameras can view the tee area at all times and communicate the images to the ball tracking services module.

Referring now to FIG. 11, there is shown another illustrative embodiment that includes a plurality of infrared cameras 730a, 730b, 730c, and 730d mounted so that the cameras 730a, 730b, 730c, and 730d can view the tee area 458 of the mat 456 at all times and communicate the images to the server 422. By identifying the ball images and tracking their angular motion, the exact position of all balls is readily calculated by the ball tracking subsystem 304. In such ball tracking systems, there is enough camera coverage to prevent normal obstruction of some camera angles by the player 718 from hindering proper identification.

In a further embodiment, every element of the ball tracking subsystem 304 is communicatively coupled to the server 422 via the LAN 418, and thereby linked to a video and/or audio alert system, that can confirm to the player that the ball on the tee 458 is properly identified and ready for play. The video and/or audio alert system may be embodied as an element of the PIU 414. For example, the video and/or audio alert system may be embodied by displaying a green light at the PIU 414 when the ball on the tee 458 is identified and a red light when no ball is properly identified on the tee 458.

Figure 12:
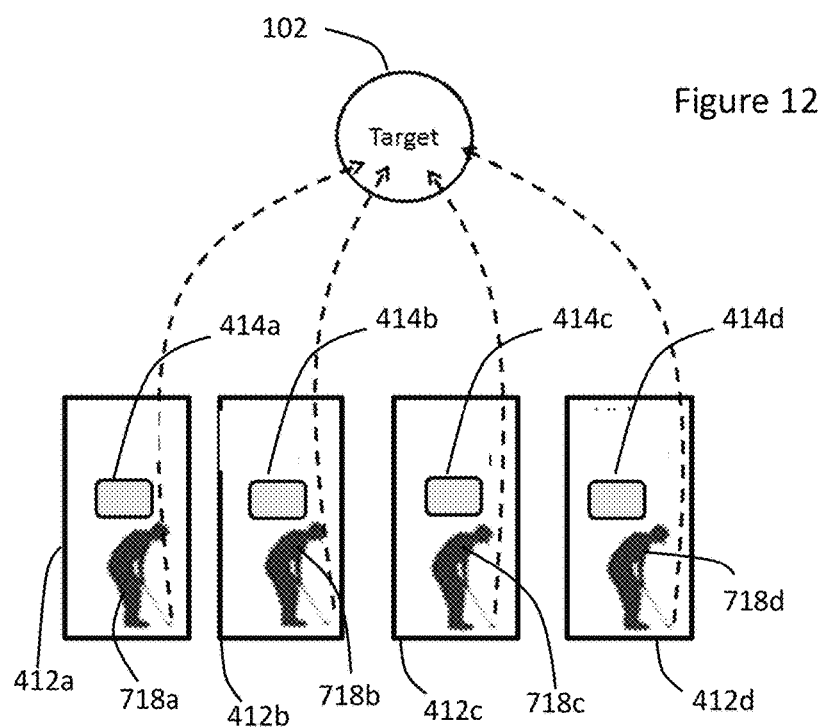
FIG. 12 shows multiple players hitting balls towards a target.
Figure 13:
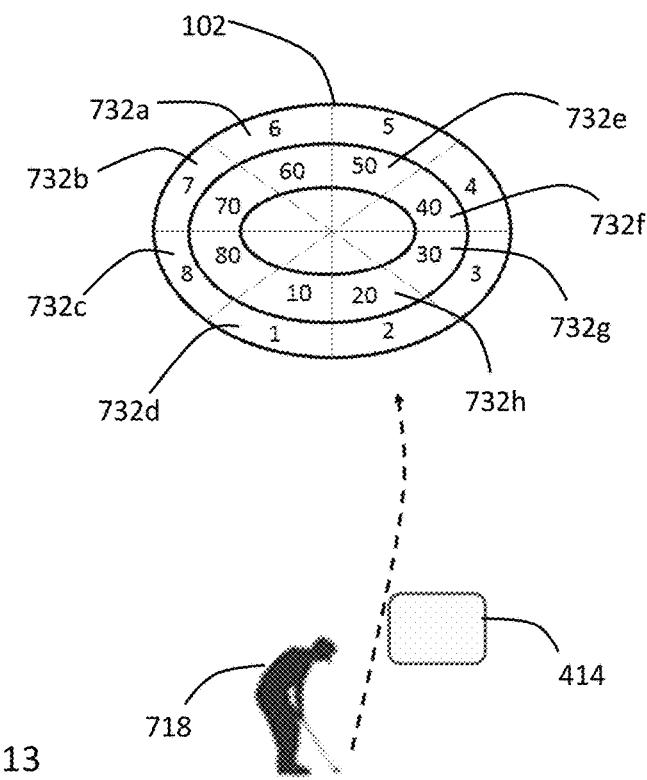
FIG. 13 shows a player hitting a ball toward a target composed of multiple target elements.

Referring now to FIG. 12, there are shown multiple players 718 striking balls from multiple hitting bays 412 toward a target 102. Each hitting bay 412 further includes a PIU 414 with at least a display 454. With reference now to FIG. 13, a player 718 may strike a ball at a target 102 having multiple target areas 732. In the illustrative embodiment, the target areas 732 have different score values. In other embodiments, the targets 102 include (a) flat areas with one or more delineated target areas 732; (b) Slanted faces with ball-collection areas; (c) inclined depressions where balls may be collected and or identified as they fall into a receptacle or tube; (d) tiered target, as describe further herein; or (e) electronically controlled displays with ball accepting receptacles or areas. In a further embodiment, the target 102 may be formed of concentric circles, wherein the base of each of the concentric circles is configured to receive golf balls by having an opening in the base of each concentric circle. The opening in the base of each concentric circle receives the gravity fed golf ball, which then travels down a chute to a target ball acceptor 1400, as described below, associated with a particular target 102 or target segment 732.

Figure 14:
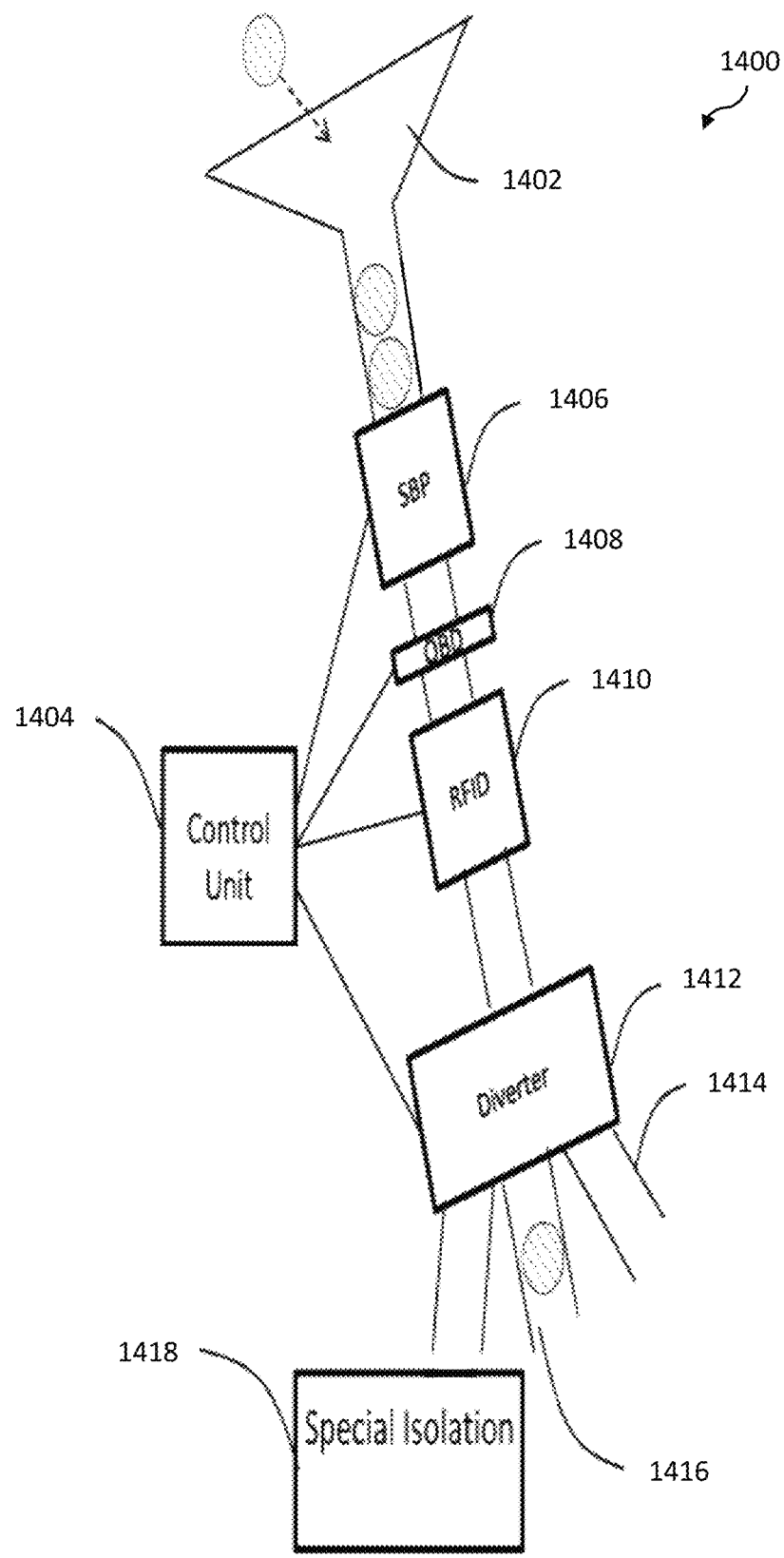
FIG. 14 shows an illustrative target ball acceptor that processes balls that strike the target.

Referring now to FIG. 14, there is shown an illustrative embodiment wherein the target 102 is a frame which has at least one opening into which a ball can travel through a funnel or entry area 1402 into a target ball acceptor 1400. The target ball acceptor 1400 processes balls that fall into a target 102 or particular target area 732. Balls enter through the entry area 1402 and, under the control of a target control unit 1404, pass through a single-ball-pass unit 1406, which will allow only one ball at a time to be processed. A ball detector 1408 confirms to the control unit 1404 that a ball has passed. The ball detector 1408 may be an optical ball detector. An RFID reader 1410 will report the RFID or other unique identifier of the ball to the control unit 1404 and via the network 418 to the server 422 as well. If there is no RFID read or other unique identifier from the RFID reader 1410, then the control computer 1404 will send a message to a diverter 1412 to send the unidentifiable ball to a rejected ball chute 1414, which will cause balls without readable RFID signals or other unique identification indicator to be collected and disposed. The unidentifiable ball hit is also reported to the control unit 1404 and thereby the server 422 for possible determination of the source through intelligent ball identification error analysis, as described herein. Balls with readable signals will be reported to the server 422 and the ball will be routed down a normal return chute 1416 where they will be available for collection and return to normal play.

In the event that a ball is of sufficient interest, as it would be if there was a high-value prize associated with the target 102 or target area 732, then the target control unit 1404 could be preconfigured to route certain balls to a special isolation area 1418. This could be a locked container where balls that are associated with high-value prize hits are retained for security validation purposes. This would be done by direction from the server 422 to the target control unit 1404.

Figure 15:
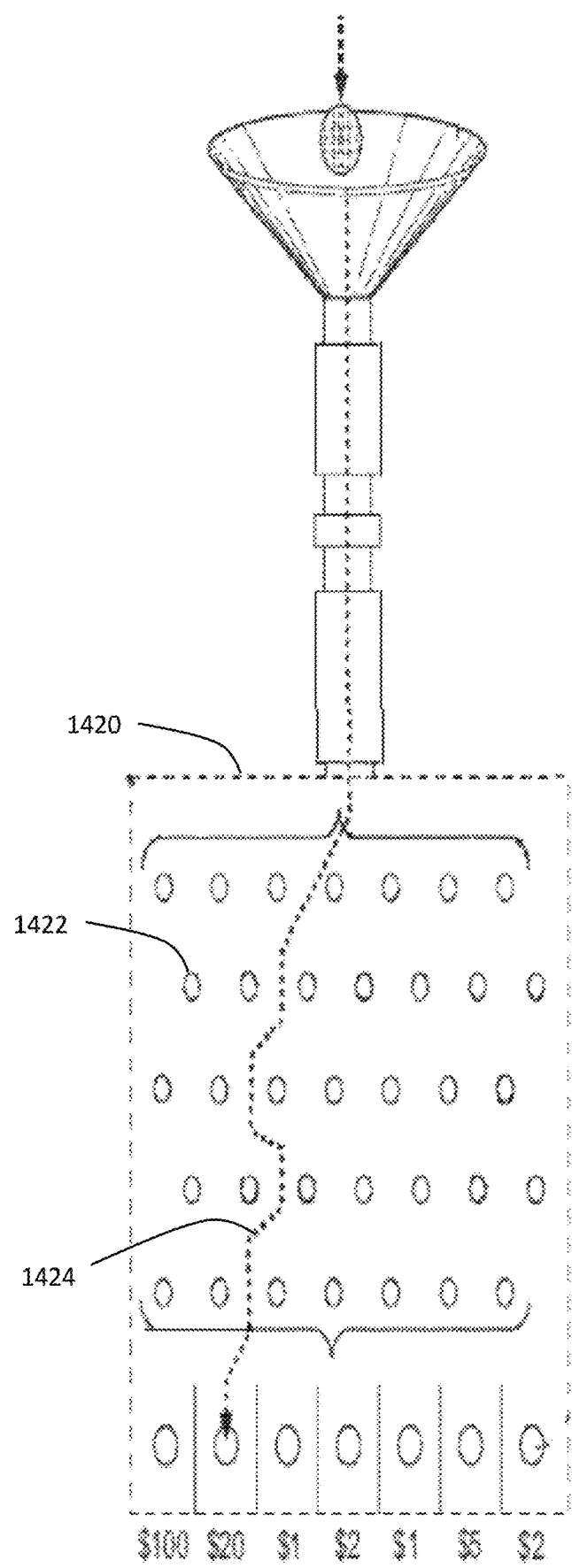
FIG. 15 shows an illustrative mechanical randomization system.

As described above, the target 102 may further include a randomizer, which provides a random game result for the embodiments including a game of chance. The randomizer may be electronic, i.e., a RNG, or mechanical, as in Pachinko. In certain embodiments a mechanical board or other mechanism may be used with the golf ball to reach a random prize. With reference now to FIG. 15, there is shown such a mechanism, a pachinko-style slanted board with obstacles 1420, such as pegs 1422, on the slanted board. It shall be appreciated by those of ordinary skill in the art that there are a variety of different gaming apparatus that can be used for the mechanical randomization system.

In operation, a mechanical process may be initiated that has a variety of outcomes that may be mapped into a prize structure. It may or may not involve movement of the ball. In the "pachinko" example, the ball finds a random path 1424 through the slanted board to a prize level at the bottom. A set of optical sensors, in which each optical sensor is positioned in each prize station, detects a ball and communicates the "hit" back to the server 422 so that the prize can be calculated and the player 718 can be informed of the winning amount. A camera focused on the slanted board may be used to display the event to the player 718 on the PIU 414 and to record the event for audit purposes.

Each target 102 provides a positive experience for players because the target 102 may include low target areas 732 into which balls may easily roll or bounce. This is good for less-skilled players who might not be able to hit the ball well consistently and would be frustrated by efforts to hit the ball into a higher, smaller target area 732. Each target 102 may is also be highly visible, making it attractive to players 718 because it will be easily visible from a hitting bay 412. The target 102 may have many different lighting options for evening visibility and entertainment. Different areas of a target 102 may be color-coded and/or lighted to indicate scoring differences. The different target areas 732 may also include mechanical or digital signage to indicate different scoring values associated with different target areas 732. The target areas 732 may be arranged into tiers having different scoring values for each tier. Such a target configuration can be achieved in a limited amount of space.

When implemented with an embodiment of the golf wagering system 400 which uses RFID as one or the sole means of ball identification, each target area 732 may have a slanted bottom area which gravity-feeds a golf ball to a receptor area which includes an RFID reader or sensor and may include a ball separation device and a ball-detector as described above. These may be separate elements, or some of the actions may be combined into units which perform more than one of the functions.

Figure 16:
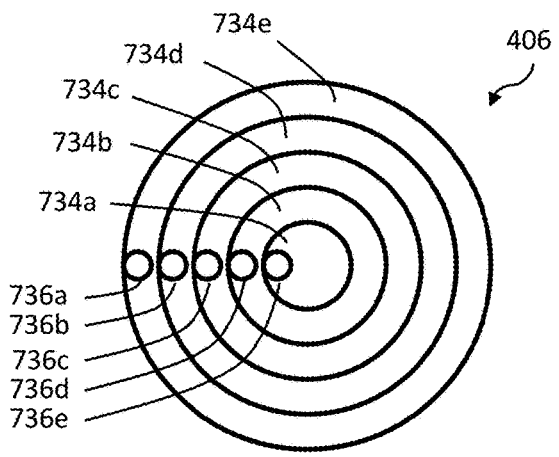
FIG. 16 shows an illustrative target including concentric rings bounding each target area.

An example of a tiered target 102 is shown in FIG. 16. In the illustrative example the tiered target 102 is formed into concentric rings 734, each of which may have a receptor area 736*a*, 736*b*, 736*c*, 736*d*, and 736*e*, such as a hole, leading to a ball receptor 1400 and be a different target area 732. In a further embodiment, the individual rings may be sectioned into parts, each one of which may have a separate scoring value.

Figure 17:
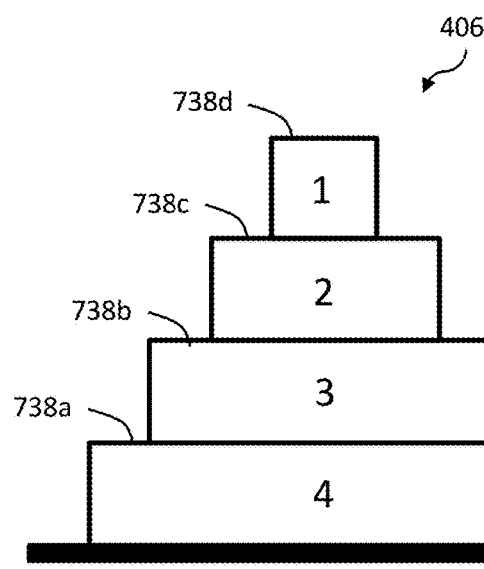
FIG. 17 shows an illustrative target having tiered levels.

Another example of a tiered target 102 is illustrated in FIG. 17. This embodiment is similar in shape to a staircase, with target openings 736 on each step 738*a*, 738*b*, 738*c*, and 738*d*. Such an embodiment is attractive because the target 102 uses space efficiently and is conducive to different types of signage and lighting. The horizontal tiered steps 738 may be further subdivided into multiple target areas 732, as shown in FIG. 18.

Figure 18:
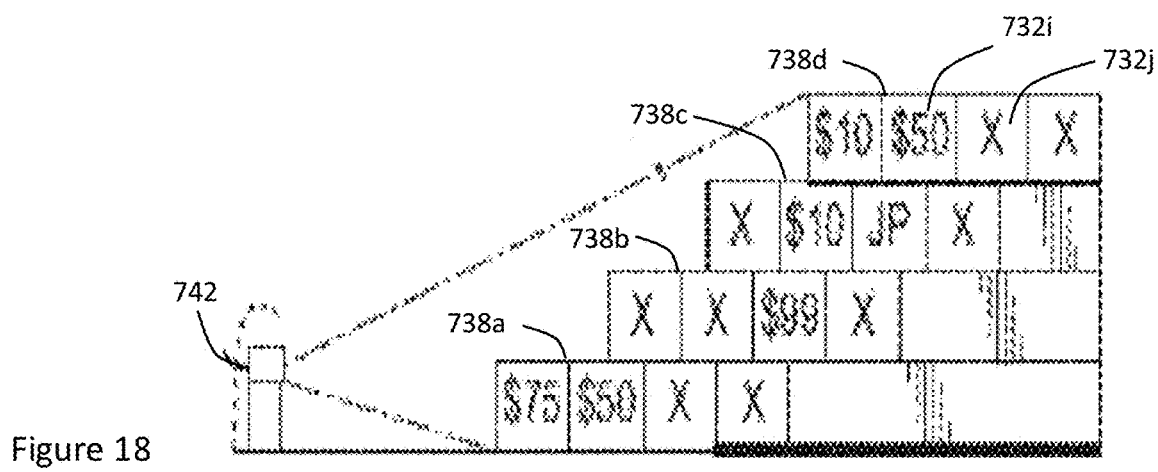
FIG. 18 shows an illustrative tiered target having target areas illuminated by a projector.

In FIG. 18, there is shown an illumination option for a tiered target configuration that includes projection lighting, either using conventional light projection of any type or laser projection. A projector 742 illuminates the target 102 and target areas 732, in so doing the light pattern cast by the projector 742 on the target 102 depicts symbols informing players 718 of the prize or game event produced by striking the target 102 or target area 732. Illustrative target areas 732*i* and 732*j* exemplify the possible result of striking a target area 732. In the illustrative embodiment, target area 732*i* is illuminated by the projector 742 with the symbol "$50" indicating that a player 718 striking target area 732*i* with a ball would be awarded a $50 prize by the system 400. In contrast, target area 732*j* is illuminated by the projector 742 with the symbol "X" indicating that a player 718 striking target area 732*j* with a ball would not be awarded a prize.

Figure 19:
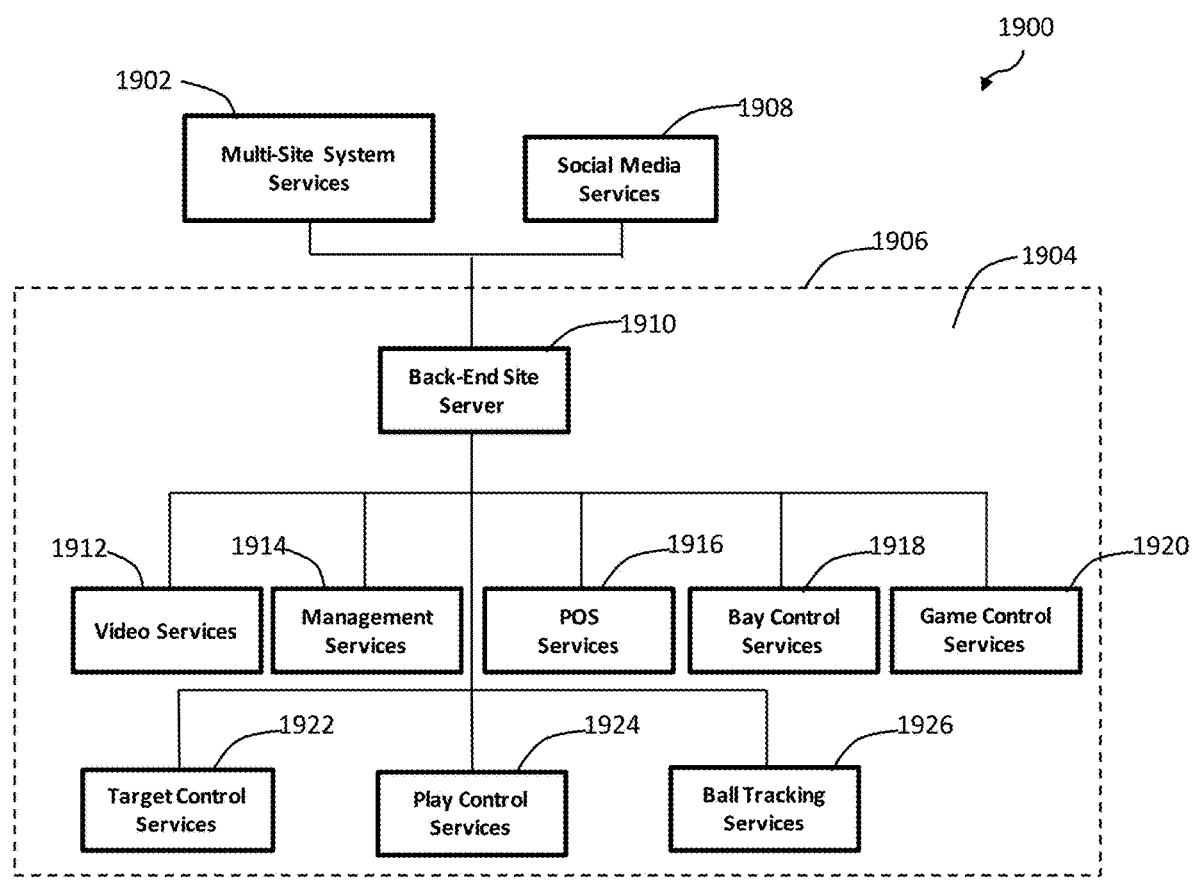
FIG. 19 shows an illustrative software architecture configured to perform the operations associated with the golf wagering system.

Referring now to FIG. 19, there is shown an illustrative software architecture 1900 configured to perform the operations associated with the golf wagering system 400. The illustrative software architecture 1900 includes a multi-site system services module 1902 and a local site services module 1904. The multi-site system service module 1902 is presented outside the site service boundary 1906 that provides an illustrative boundary condition of the site services module 1904.

The illustrative multi-site system services module 1902 supports the services for multiple operational sites or facilities, in which each operational site may include a site services module 1904. Thus, the multi-site system services module 1902 performs specific services for multiple operational sites. By way of example and not of limitation, these multi-site services may include a software management module associated with at least one wide-area progressive prize, a first database for player prize points, a second database that includes a plurality of merchandise prizes that may be purchased with player prize points, a prize software module that includes one or more access functions that enable each player to access information corresponding to prize points and redeeming prizes. Additionally, the multi-site system services module 1902 may also include a database of information regarding the operational and financial performance of individual sites.

An illustrative social media services module 1908 is also disposed outside the site service module boundary 1906. In the illustrative embodiment, the social media services module 1908 is also communicatively coupled to at least one of the site services modules 1904. In one illustrative embodiment, multiple elements of the site services module 1904 and the golf wagering system 400 may also have access to social media services module 1908. By way of example and not of limitation, the social media services module 1908 is configured to interface with social networks such as Facebook, Twitter, Instagram and other such social media networks. In operation, the social media networks provide a platform to distribute content associated with the golf wagering system 400, the illustrative golf facility operating the golf wagering system 400, the multi-site system service module 1902, one or more of the site services module 1904, and other such systems or modules that communicate content to a social media network.

In an illustrative embodiment, the multi-site system service module 1902 and the site services module 1904 may be accessible on a WAN, e.g. the Internet, through common desktop or mobile browsers such as Internet Explorer, Chrome, or other such browsers. The multi-site system service module 1902 and the site services module 1904 may also be accessible through an "application" that is loaded on a personal computing device such as a tablet computer, a smartphone, a virtual reality goggle and other such personal computing devices. Additionally, certain aspects of the multi-site system services 1902 may only be accessed by authorized components of one or more of the site services modules 1904.

The site services module 1904 includes a back-end site server 1910 that may be located in the operational facility or on a remotely located operational site, in a co-hosting location, in a cloud-based facility or in any other such computing facility. The location of the back-end site server 1910 may be based on the system design constraints such as cost, reliability, security, throughput and response time. The back-end site server 1910 may also be embodied as a suite of multiple servers.

The back-end site server 1910 stores and processes the operational site data. For example, the storage capabilities of the back-end site server 1910 include database structures utilized for financial and operational needs. In one illustrative embodiment, the back-end site server 1910 includes detailed site financial data and performs management of all player financial play sessions. In another illustrative embodiment, the back-end site server 1910 stores and processes historical information on player activity and aggregates statistical information on all game play and games. Additionally, the back-end site server 1910 logs system activity, game activity and configuration data on the system, including target location data. Furthermore, the back-end site server 1910 may host multiple software applications for management of the site operation, including human resources and employee scheduling. Further still, the back-end site server 1910 may be embodied as one or more virtual servers that may be associated with a cloud service such as Amazon Web Services or Microsoft Azure.

The back-end site server 1910 may include or be communicatively coupled to a video services module 1912. The video services module 1912 manages video-specific information such as the site-wide video resources that include certain monitors in the hitting bays 412, large monitors in multiple locations in the facility, monitors in restaurants, monitors in the target range, monitors in reception areas and in any other locations where it may be desirable to display information to players. The video services information managed by the video services module 1912 may include promotional information for the site, advertising, winner recognition, player bonus play, informational videos, and other such video information. Additionally, video services may include information regarding active game play, leader boards, reward structures and payouts.

Also, the back-end site server 1910 may include or be communicatively coupled to a management services module 1914 that will provide access to the information and operational functions necessary for site operation. The management services module 1914 allows employees to access operational sub-systems according to applicable security protocols and sub-system operational parameters. The management service module 1914 may also provide access to financial and operational history information, as well as the ability to configure the operational aspects of the system.

A POS services module 1916 may also be communicatively coupled to the back-end site services module 1910. The POS services module 1916 is operatively coupled to kiosks or cash registers disposed at retail points and POS stations 114 depicted in FIG. 4. By way of example and not of limitation, the kiosks or cash registers may be used to create player accounts, add funds to player accounts, provide refunds, and perform other player service functions.

The back-end site server 1910 may include or be communicatively coupled to a hitting bay control services module 1918. The bay control service module 1918 may be processed or managed by each PIU 414, a hitting bay server (not shown), or any combination thereof. The bay control services module 1918 manages player activity in each hitting bay 412. Additionally, the bay control services module 1918 coordinates the operations associated with player accounting, selection of games, display of play and game information in the hitting bay 412, initiating and monitoring of ball dispensing, reporting play results, accepting additional player funds and other such bay control operations. The bay services module 1918 may also coordinate the activities associated with the ball dispenser 460, the game control services module 1920, player display embodied in the PIU 414, user interface 450, input from player identification devices, such as card readers and smart-phones, and play control services module 1924. Additionally, the bay services module 1918 may also recognize the initiation of game play.

The back-end site server 1910 may include or be communicatively coupled to the game control services module 1920, which is configured to support a suite of game modules corresponding to a variety of games that players 718 will be able to select in the hitting bays 412. The games may include many types of entertainment and wagering games. Each type of game will have different video presentations and may, in the case of wagering games, be associated with different pay-tables and use the services of a secure RNG to produce game results which may be the hybrid result of the results of a skill-based event and the random results based on one or more RNG results. Additionally, the game control services module 1920 may also display ongoing game progress and competitive position for live/active play. Furthermore, the game control services module 1920 compiles historical play in information to update odds and percentages for an on-going game.

The back-end site server 1910 may include or be communicatively coupled to a target control services module 1922. The target control services module 1922 manages activity corresponding to one or more targets 102 and, further, makes determinations associated with target hits. The target control services module 1922 may also perform functions that include controlling or communicating with the tracking module, which may include a plurality of optical detectors that determine when a ball has entered the target 102. The target control services module 1922 also has the ability to access enhanced logic, such as the intelligent analysis method described herein, that determines the source of a ball entering the target, even if the RFID cannot be read. Furthermore, the target control services module 1922 may be configured to divert a ball with an unreadable RFID to a holding area for removal from the golf wagering system 400. Further still, the target control services module 1922 may be configured to isolate a ball that has been determined to have won a high-value prize for prize validation of security purposes. Further yet, the target control services module 1922 may also determine, recalibrate and confirm location of targets 102 in relation to the player 718. Further still, the target control services module 1922 provides critical information such as distance, slope and other such information which would be particularly significant to mobile targets.

The back-end site server 1910 may include or be communicatively coupled to the play control services module 1924. The play control services module 1924 provides the detailed management for the devices associated with receiving and hitting a ball, which includes the detection of the player requesting a ball, such as by the player identification device 452 of the PIU 414, the validation that the ball to be dispensed has a valid unique identification indicator, such as an RFID, the diversion of a ball with an unreadable unique identification indicator, such as an RFID to a holding area for removal from the system, and the dispensing of the ball to the player 718 by the dispenser 460. Additionally, the play control services module 1924 associates and tracks a player 718 and the player's activity with a play object.

The back-end site server 1910 may include or be communicatively coupled to a ball tracking services module 1926. The ball tracking services module 1926 stores, manages or controls ball information that includes ball location from the time of the ball is hit until the flight of the ball concludes. The ball information may also include generation of directional information on the flight of the ball to enter into calculations of probable target impacts. Depending on details of system implementation, information sources for the calculations can come from one or more of the following sources: Dual-matrix data, Doppler radar, video images, laser tracking devices, or other new technology. Additionally, the ball tracking services module 1926 also tracks key information regarding timing for flight of the ball for verification and legitimacy of game play.

It will be appreciated by those of skill in the art that there are multiple ways of implementing the software systems and methods described above. For example, the high integrity gaming system and corresponding software architecture may be embodied in a dedicated local computer or microprocessor or may be embodied in a local server, a virtualized server, a remotely hosted server, a cloud-based service provider, such as AWS and Azure, and any other such source. The software modules may also be embodied in a client-server system, a peer-to-peer system, a hierarchical computing system or any combination thereof. Communications between the various electronic and computing systems may be performed using LAN communications, WAN communications and other viable communication methodologies, including serial or parallel data transfer, Bluetooth, NFC and other such technologies.

In an illustrative embodiment, a game session begins when a golf ball with a unique identifier is delivered or dispensed to the hitting bay 412. The ball ID and hitting bay 412 to which the ball is delivered are recorded in the database 424. With reference to FIGS. 4 and 5, each of the hitting bays 412*a*, 412*b*, 412*c*, and 412*d* are configured to provide sufficient space for the various hardware components described in FIG. 5 and for a player 718 to strike a ball. During game play, the player 718 strikes the golf ball from the hitting bay 412. The time of ball strike, as well as ball trajectory information are recorded by the tracking subsystem 304 and stored in the database 424. The struck ball then travels to a target 102 located in a target range 404 or a golf driving range 100, a golf course, a gaming establishment, such as a casino, or any such location that can house a hitting bay 412. Upon arriving at a target 102, the ball is detected by the ball detector 1408, the ball identifier is read, if possible, by the ball reader or RFID reader 1410. The ball arrival time and associated identifier are recorded in the database 424. The server 422 then determines the player 718 responsible for the target strike from the information recorded in the database 424, and initiates a secondary game of chance corresponding the particular target 102 struck. A random event determines the outcome of the game of chance, and the player is awarded the first prize and any second prize in an entertaining animation.

Figure 20:
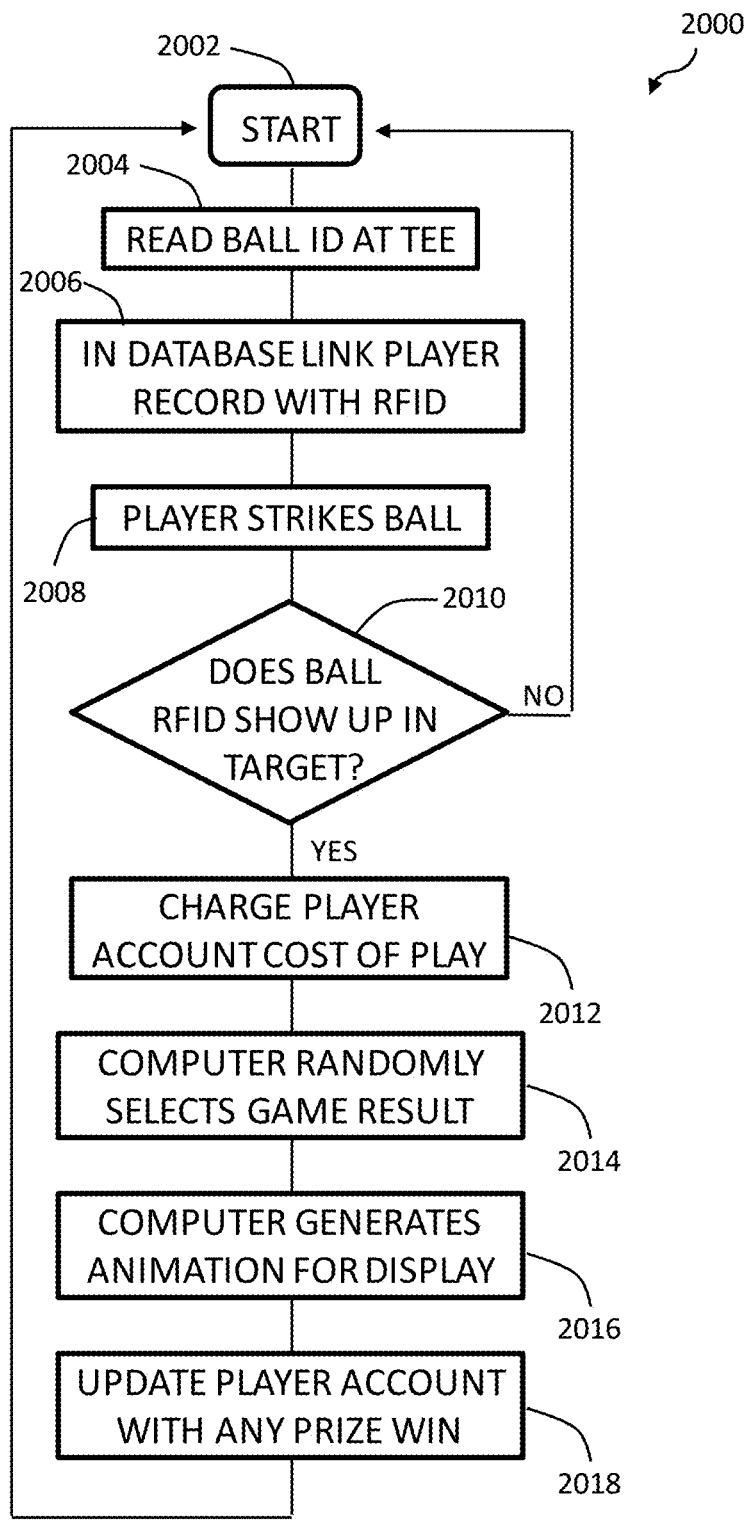
FIG. 20 shows an illustrative method for interacting with an illustrative golf wagering system.

Referring now to FIG. 20, there is shown one embodiment for interacting with an illustrative golf wagering system 400. The method 2000 is initiated at "start" 2002. At step 2004, a player sets a ball in the tee area 458 and a ball identifier module 408 including an RFID reader reads the unique RFID from the ball to associate that ball with the particular player 718.

At step 2006, the ball is then linked to the player record with the particular RFID code in database 422. At step 2008, the player strikes the ball in the tee area 458 from the mat 456 while in hitting bay 412, putting the RFID golf ball into play. A decision point is then reached at step 2010. If the ball lands in the target range 404, but not in a target 102, the process returns to start step 2002. In that case, the ball is collected from the target range 404, reset and made available for replay. If the ball lands in a target 102, the process moves on to step 2012.

At step 2012, the player's account is charged for the cost of hitting the target 102 and a game of chance is initiated in the form of a wager on the randomization game. At step 2014, a random game result is selected. At step 2016 a game animation is generated and shown on display 454 for the player to view and enjoy. Several game animations are depicted by FIGS. 28 through 31, and describe below.

At step 2018 the system is updated with play information necessary for audit controls, and the player account is updated to reflect play data and any winning prize amount.

Figure 21:
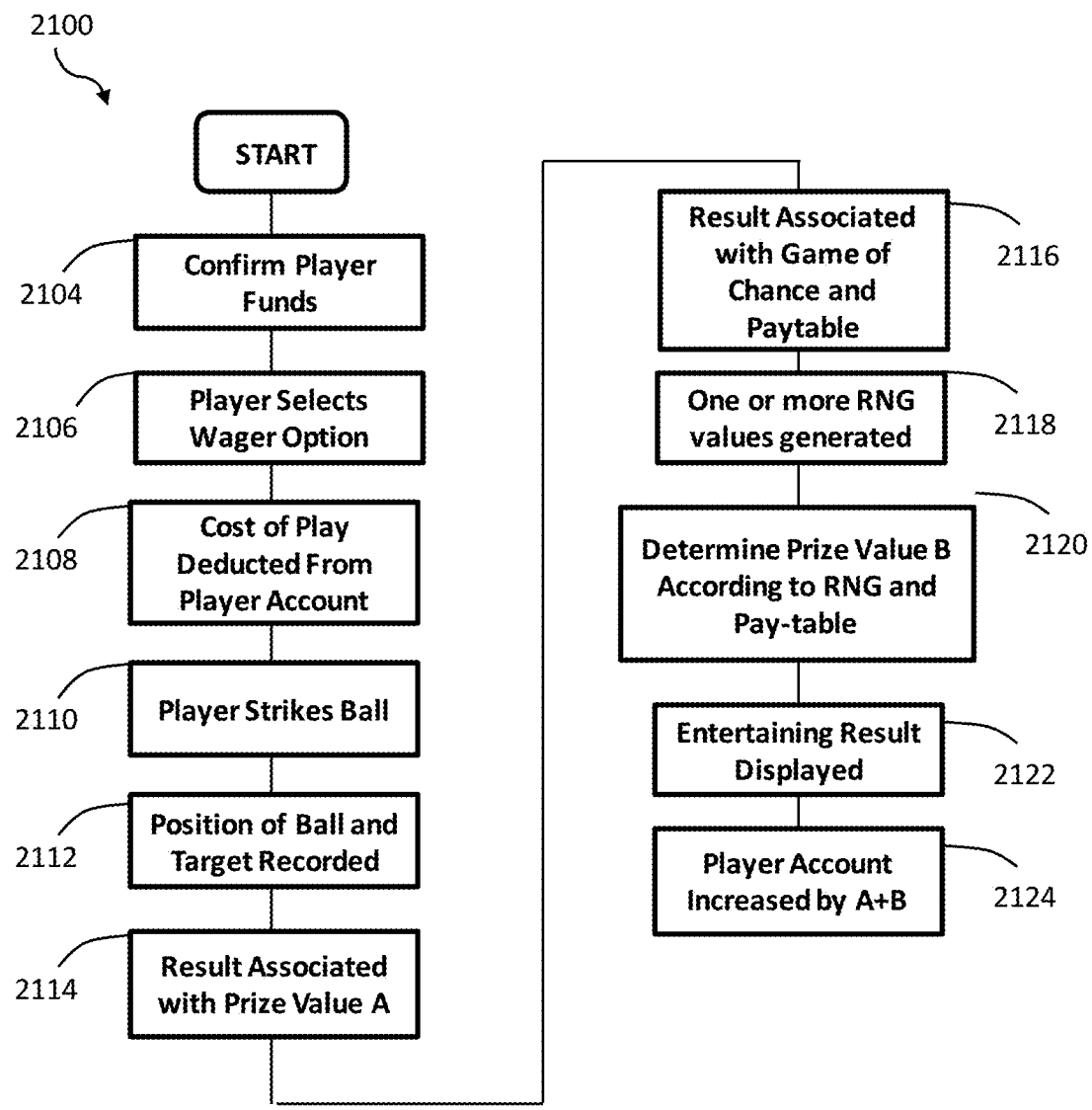
FIG. 21 shows a further illustrative method for interacting with a golf wagering system.

With reference now to FIG. 21, there is shown a further method of operating a golf wagering system 2100. The player 718 starts the method by interacting with the PIU 414. At step 2104, the system confirms that the player 718 has funds in an account linked to the player 718. If there are insufficient funds, the player 718 will be prompted to transfer funds into the player's gaming account, and play will not begin until the player 718 has done so. The player will have the opportunity to set certain wagering options before play at step 2106. These options may include setting a wager denomination and specifying a particular choice of entertainment display, i.e. a game selection. Upon receiving the player selection, at step 2108 the system deducts the cost of the play from the player's account.

At step 2110, the player 718 sets a ball on the tee 458 and strikes the ball. The ball is linked to the player record with the particular RFID code in database 424. The result of the ball flight towards the target 102 is recorded in step 2112 by the tracking system 304. At step 2114, a primary prize amount, A, is recorded for the play. The primary prize amount, A, is based on the result of the ball flight towards the target 102. In various embodiments, the primary prize amount, A, may be a function of the identification of the particular target involved, the proximity of the ball hit to the target 102, the distance of the target 102 from the hitting bay 412 and other factors that may be associated with the target 102 and associated parameters. The primary prize amount determination may also vary by day of the week, time of day, pre-scheduled promotions, and other factors as determined by game designers and facility managers and supported by the management software in the system.

At step 2116, the target result may be a game of chance having any one of a number of different pay-tables that are associated with the various target results. In various embodiments, the game of chance and pay-table selection may be the result of prior play. In one embodiment, the available prize pay-table may vary in a well-defined way based on prior play history. At step 2118, an RNG generates one or more random numbers, facilitating game play corresponding to the particular game of chance and pay-table. In this manner, the game of chance is implemented in any one of a number of ways in step 2118. In various embodiments, the game of chance is implemented as a slot-machine model, where the RNGs may be used to calculate random positions of multiple reels with slot symbol positions. At step 2120, a resulting symbol matrix may then be used to calculate a winning prize value B. In various embodiments, the prize value may be determined using an RNG and a table of prize values with associated probabilities. In still other embodiments, the player 718 may be engaged in a bingo game, either with another player or players in the same facility or in different facilities. As a result of the bingo game the player 718 will have a determined prize value. At step 2122, the determined prize value is displayed to the player 718 by the PIU 414. The result display may present an entertaining animation with a combination of symbols which allows calculation of a prize that equals the predetermined value. No matter the embodiment, at step 2122 the player 718 is shown an animated matrix of symbols and a prize result displayed with interesting visuals, sound, and anticipation. The method terminates at step 2124, where the player account is updated with any winning amounts representing the primary and secondary prize win total. Note that in some cases they can be separately displayed, and in other cases combined, depending on a desired game presentation of the game design.

Figure 22:
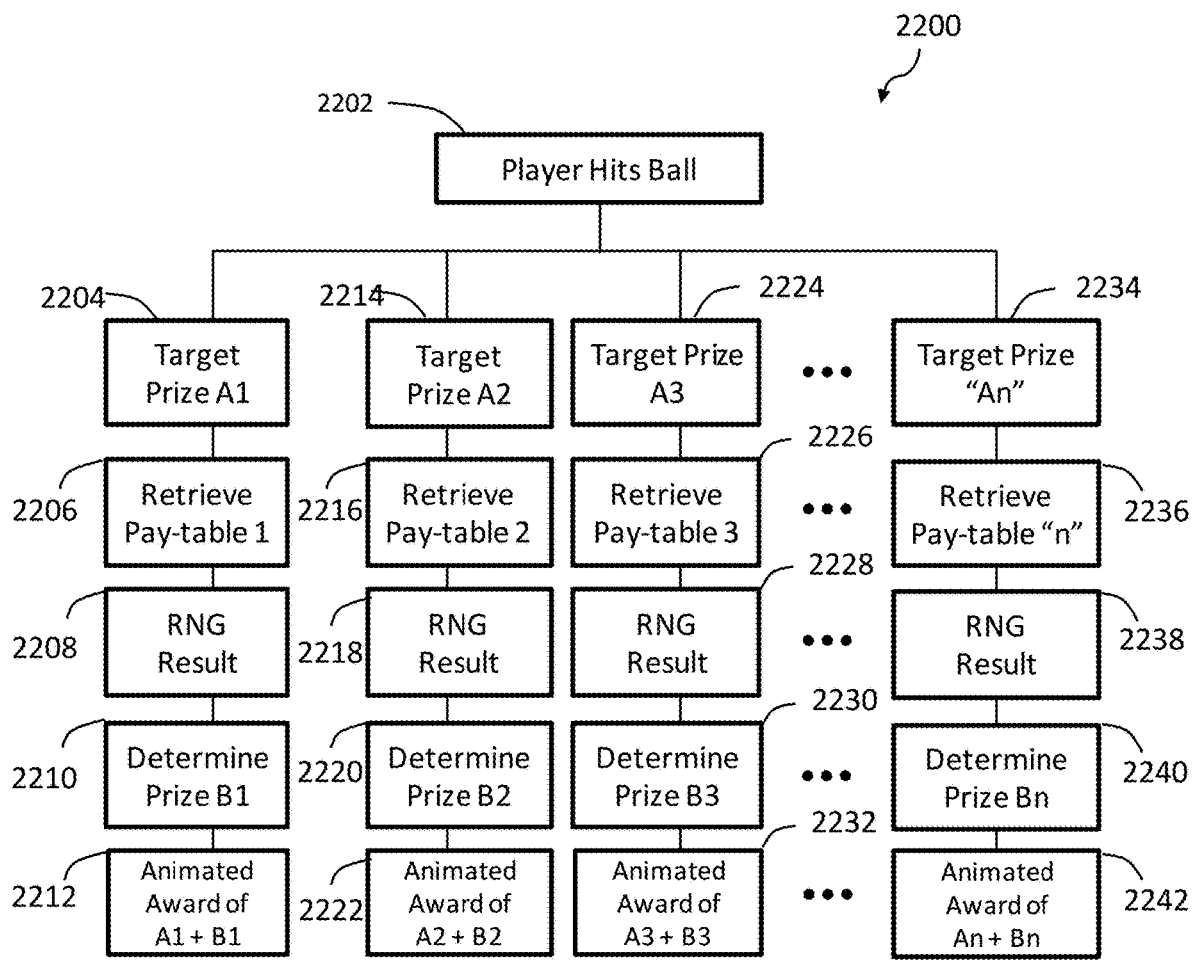
FIG. 22 shows an illustration of the relationships between the result of a target hit and the subsequent prize determination and display to the player of an entertaining result.

With reference now to FIG. 22, there is shown an illustrative flow chart 2200 of game events triggered by successful player 718 target hits. The following game events and operations described herein may be performed by the server 422, the PIU 414, the bay control device 716, the target control 1404, or any combination thereof. The flow chart 2200 begins with a player 718 hitting a ball at block 2202. Where the player 718 strikes exemplary target 1 at block 2204, the system credits target prize A1 to the player 718. At block 2206, the system retrieves associated pay-table 1 from a database. In some embodiments, the system retrieves pay-table 1 from database 424 over the LAN 418. The system then generates a random number associated with a random game result through electronic or mechanical methods at block 2208. The system uses the random number result and pay-table 1 to determine a second prize B1 that is credited to the player 718 at block 2210. The method terminates by displaying an entertaining animation wherein the player 718 is awarded prize A1 and B1 at block 2212.

Where the player 718 strikes exemplary target 2 at block 2214, the system credits target prize A2 to the player 718. At block 2216, the system retrieves associated pay-table 2 from a database. The system then generates a random number associated with a random game result through electronic or mechanical methods at block 2218. The system uses the random number result and pay-table 2 to determine a second prize B2 that is credited to the player 718 at block 2220. The method terminates by displaying an entertaining animation wherein the player 718 is awarded prize A2 and B2 at block 2222.

Where the player 718 strikes exemplary target 3 at block 2224, the system credits target prize A3 to the player 718. At block 2226, the system retrieves associated pay-table 3 from a database. The system then generates a random number associated with a random game result through electronic or mechanical methods at block 2228. The system uses the random number result and pay-table 3 to determine a second prize B3 that is credited to the player 718 at block 2230. The method terminates by displaying an entertaining animation wherein the player 718 is awarded prize A3 and B3 at block 2232.

Thus, the method 2200 may extend for "n" number of targets 102, each associated with a pay-table and a prize. In various embodiments, the pay-table associate with each target 102 may be unique and distinct from all other pay-tables. In further embodiments, there may be tiers of targets all having the same or similar pay-tables, thereby reducing the complexity of the game. By way of example, where the player 718 strikes target n at block 2234, the system credits target prize An to the player 718. At block 2236, the system retrieves associated pay-table n from a database. The system then generates a random number associated with a random game result through electronic or mechanical methods at block 2238. The system uses the random number result and pay-table n to determine a second prize Bn that is credited to the player 718 at block 2240. The method terminates by displaying an entertaining animation wherein the player 718 is awarded prize An and Bn at block 2242.

In order to achieve improved error reduction in ball tracking, an intelligent ball identification error analysis method is utilized. The intelligent analysis method analyzes tables of ball characteristic information to reduce the number of possible identities of received unreadable balls, and frequently to accurately identify the unreadable balls. The intelligent analysis method operates to increase player satisfaction and regulatory compliance by decreasing the incidence of target strikes that are not attributable to a particular player.

Figure 23:
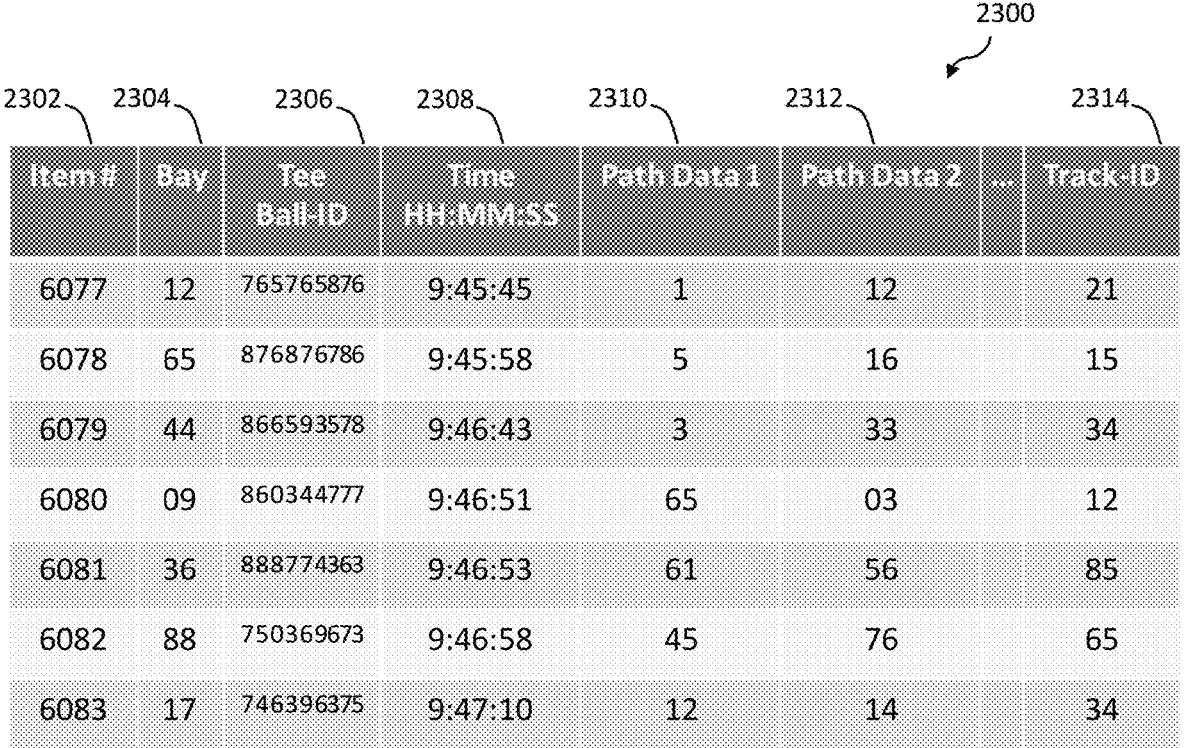
FIG. 23 shows an illustrative target ball identification analysis table.

Referring to FIG. 23, there is shown an illustrative target ball analysis table 2300 utilized in the intelligent analysis method. The table describes the various characteristics of each ball hit in the system, including an item number 2302 corresponding to a database identifier, an associated bay 2304, a ball identification recorded when the ball is dispensed at the tee 2306, a time at which the ball was struck 2308, a first flight path data value 2310, a second flight path data value 2312, a Track-ID 2314, and other potential ball characteristic information such as color, bar code, QR code, etc. The table 2300 may be compiled from the information collected by the bay computing device 716. The target ball analysis table 2300 receives the RFID of the ball being hit from the dispenser 460. The table 2300 receives, from the tracking system 304, multiple data points corresponding to the ball trajectory 710. The type of information received by the table 2300 may vary somewhat depending on the capabilities of the tracking system 304. At a minimum, the table 2300 includes the velocity vector of the golf ball as a function of an elevation angle and a horizontal angle. In various embodiments, this information may further include more detailed projections factoring effects from ball spin, such as the degree of hook, slice, or excess/reduction in elevation. In still other embodiments, a summary of all the information contained by the table 2300 may be consolidated into a track ID 2314 for each ball. The track ID 2314 represents a mapping of the projected ball path to one of N predetermined groups. The predetermined groups may be embodied or organized in several different fashions described herein.

In an illustrative embodiment, each Track-ID value is a combination of direction of a ball hit and speed. For example, a particular Track ID may be assigned to balls hit high to the left at a speed of 75 miles per hour ("mph") to 100 mph. Track-IDs may be used to refer to any group of measurable ball attributes including horizontal angle of hit, vertical angle of hit, ball speed, ball spin, and other such ball attributes.

Figure 24:
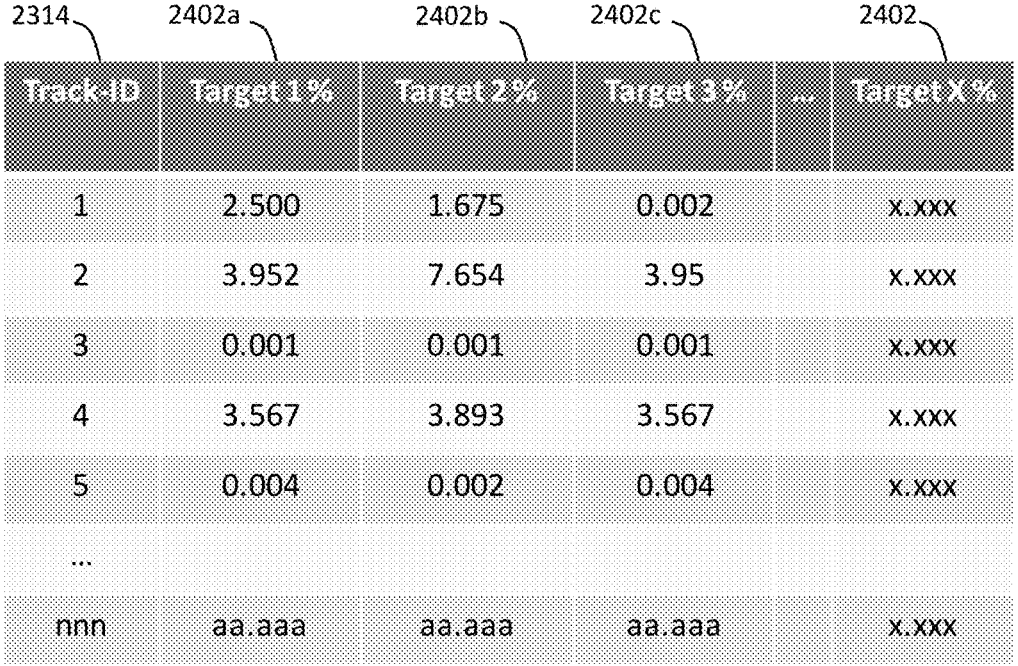
FIG. 24 shows a matrix generated for a hitting bay showing the probability of hitting each possible target based upon different ball trajectories.

Referring now to FIG. 24, there is shown a matrix 2400 generated for a hitting bay 412 showing the probability of heating each possible target 2402*a*, 2402*b*, 2402*c*, etc. based upon various ball trajectories. This table 2400 has nnn rows, each corresponding to a track ID 2314 for that bay 412. The table 2400 has a column for each target 102 on the range 404. For each combination of target 2402 and track ID 2314 a percentage weight is assigned, which is the probability that a ball hit on the track ID hits a given target 102. As an example, if the track ID suggests hitting a ball 100 yards toward the leftmost portion of the range the probability of it hitting a ball in the rightmost section of the range will be near zero. As the track ID suggests an impact closer to the target the probabilities will increase.

Figure 25:
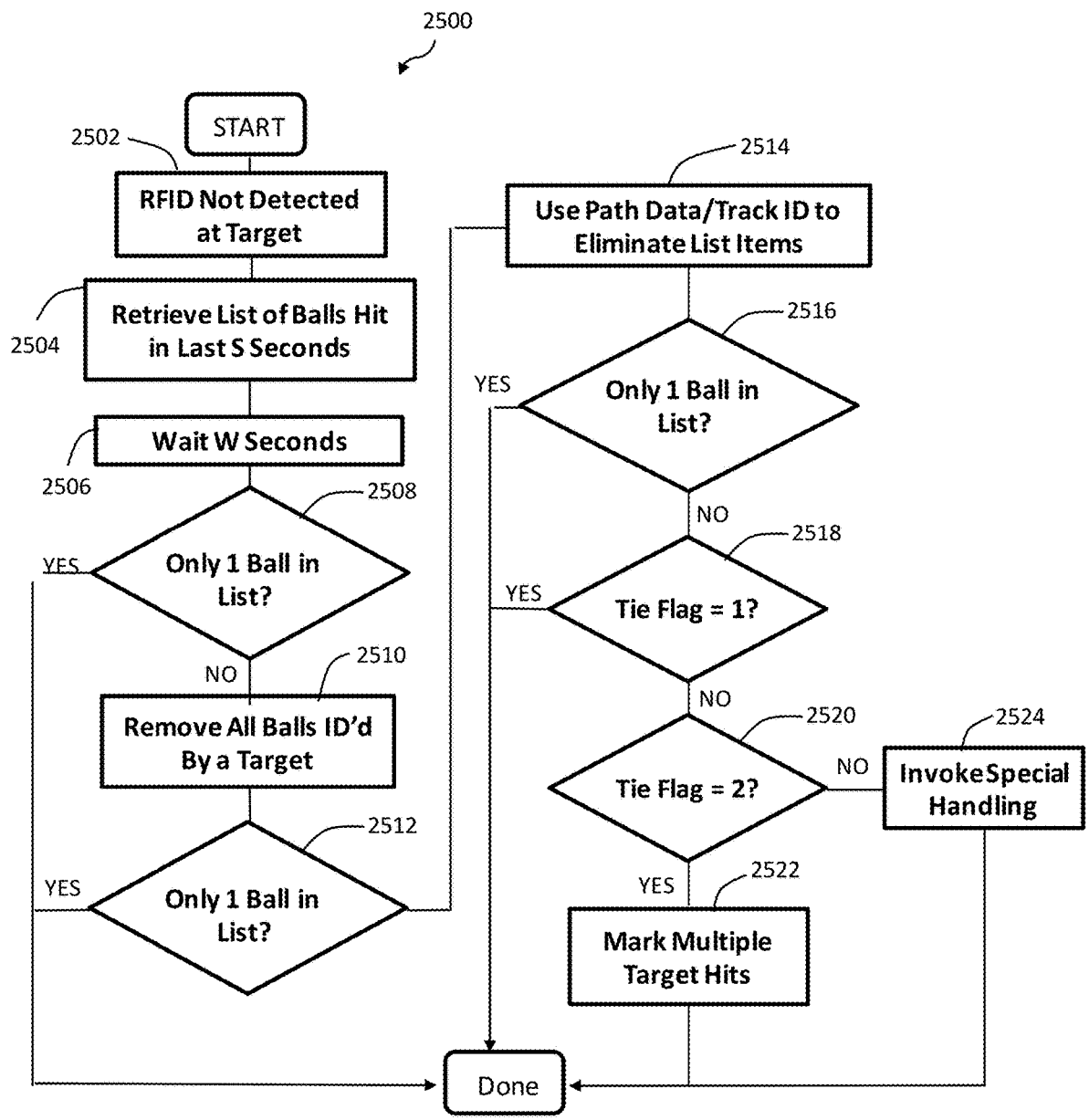
FIG. 25 shows an illustrative ball identification error analysis method that dramatically reduces the error rate experienced by players and enables many unidentifiable golf balls to be properly associated with the bay from which they were hit.

Referring to FIG. 25 there is shown an illustrative method 2500 that enables many unidentifiable balls to be properly associated with the bay 412 from which they were hit, thus dramatically reducing the error rate experienced by a player 718. The illustrative method 2500 achieves a reduced error rate by minimizing the occurrence of an unidentifiable ball. The probability of having an unidentifiable ball may never be zero because the traumatic hit of a golf club to a golf ball with imbedded electronics, such as an RFID tag, is likely to eventually cause a failure.

The method 2500 begins at step 2502 when the RFID detector 1410 in the target 102 detects a ball with an unreadable RFID. The RFID detector communicates with the server 422, which performs the error analysis. The method 2500 retrieves a list of all balls hit during a period of time, e.g. "S" seconds, at step 2504. In one embodiment, the period of time may be from the time the unreadable RFID was detected to S seconds before the unreadable RFID was detected. At block 2506, the method 2500 waits W seconds, as indicated by parameter W in database 424. The method retrieves from database 424 the list of all balls hit in the last "S" plus "W" seconds.

At decision diamond 2508, the method 2500 determines that if there is only ONE ball in the list, then the point of origin is that ball's hitting bay 412, and the method 2500 is complete because the point of origin has been determined. At step 2510, the list is examined for any balls that have already been identified as arriving at a target 102. Those balls are eliminated from the list. At decision diamond 2512, the method 2500 determines whether there is only ONE ball left in the list, and if so the method 2500 is complete.

At step 2514, the track ID data 2314 is used to eliminate ball hits for all balls for which the probability of hitting the target 102 in question is below a specified threshold, i.e., only for zero probabilities, for all probabilities below 0.01%, for all probabilities below 1%. At decision diamond 2516, the method 2500 again determines that if the number of possibilities left is ONE, then the process is complete. In the event that there remains more than ONE possibility, a Tie Flag in database 424 is used. The Tie Flag is a system configuration variable, settable based on the type of system usage. At decision diamond 2518, if the Tie Flag is set to ONE, then the prize is awarded to the most probable bay 412 from which the ball that struck the target was hit. At decision diamond 2520, if the Tie Flag is set to TWO then it is considered a tie and ALL items left in the list are marked as hitting the target 2522. At decision diamond 2520, if the Tie Flag is set to THREE then special handling 2524 is invoked. In some embodiments, special handling 2524 includes making a judgement according to a special rule set or providing human judgment.

Referring now to FIGS. 26 through 31, there are shown a variety of different games and prize redemptions associated with each game embodiment. In some embodiments, wagering games may be funded by the act of hitting a ball or paying a time-based fee for game play. In those cases, the prizes may be a function of what target is hit and the results of a game of chance which is initiated by the target hit.

If regulations specify that no skill is permitted to impact the result when a wager is placed and/or to guarantee that a misread ball ID at a target 102 does not penalize a player 718 financially, a positive ID mechanism embodiment may be used which requires that: (a) a charge for a player to pay for a wager only occurs AFTER the ball has been hit; (b) the ball has entered a target area 732; and (c) the ball has been identified and linked to a ball that has been previously associated with a particular player 718. In this manner, a player 718 will never encounter a situation where a golf ball is hit and paid for and a corresponding target hit is not properly associated with the play. The positive ID mechanism provides additional value by removing an element of skill in the game play. Thus, whether a golfer is a beginner or professional, the player only pays are for balls that enter the target.

In various embodiments, the game of chance play mechanism engages after a target hit. After a target hit, a randomized process determines various prize levels. The randomization process can be of an electronic or mechanical nature.

Where the randomization event is purely electronic, then the server 422 or the PIU 414 generate a game and an associated animation for presentation on one or more electronic displays that may be associated with the PIU 414. The form of the electronic animation can be of any variety. It may be an electronic representation of a slot machine, or a horse race, a wheel spin, a simulation of any wagering game, or any other imagined way of presenting the prize. One or more randomization events will occur in the system and, based upon a wager amount, a resulting prize level will be determined and an animation will be presented to the player at the PIU 414. The game content, or portions of it, may also be presented on other electronic displays throughout the facility. For instance, if the game played involves a large bonus prize, it may be of interest to other players that a ball hit by a player 718 in the hitting bays 412 has won the prize, and that information can be presented to multiple players on a centrally located display and/or on displays in the other hitting bays 412 where other players and spectators are located and can view them.

Additionally, some regulations may support wagering based on pure skill based games. Furthermore, some regulations may support wagering based on a combination of skill based games and no-skill based games, i.e. games of chance. The amount of skill and the amount of chance for each game will depend on game design objectives and constraints. The games of skill and games of chance may further be embodied as group games, individual games, or a combination thereof, e.g. a progressive prize. A unique aspect of some illustrative embodiments is the integration of a game of skill, such as golf, with a game of chance.

For example, in one embodiment a group game may include a number of steps, in which a group of N players 718 enroll in a game play round for a fee. Each game has a fixed number of balls with each player 718 assigned to hit m balls. Once all balls have been hit, a score and/or randomized prize are determined by the bay computing device 1002 for each ball landing in a target 102. Throughout play, players 718 can check progress on displays 454. Actual game play steps may include, in addition to hitting balls, a wheel spin or other game for a progressive jackpot prize.

In another embodiment, a n-balls-in-order game includes a player 718 attempting to hit targets 102 in a particular order. More specifically, a player hits balls and attempts to hit targets in a numerical order, e.g. 1, 2, 3, 4, . . . n. The prize value is determined from the number of targets 102 hit and those targets 102 hit in the correct order. For example, hitting exemplary targets 1 through 3 in order wins prize value A, and hitting exemplary targets 1 through 5 wins a bigger prize, value B. Play status is always indicated to the player 718 on one or more video screens, including the display 454 on the PIU 414. When a predetermined maximum number of consecutive targets 102 or target areas 732 are hit the prize may include a game of chance with a wheel spin or other game representation which provides a randomized chance to win a progressive prize.

Figure 26:
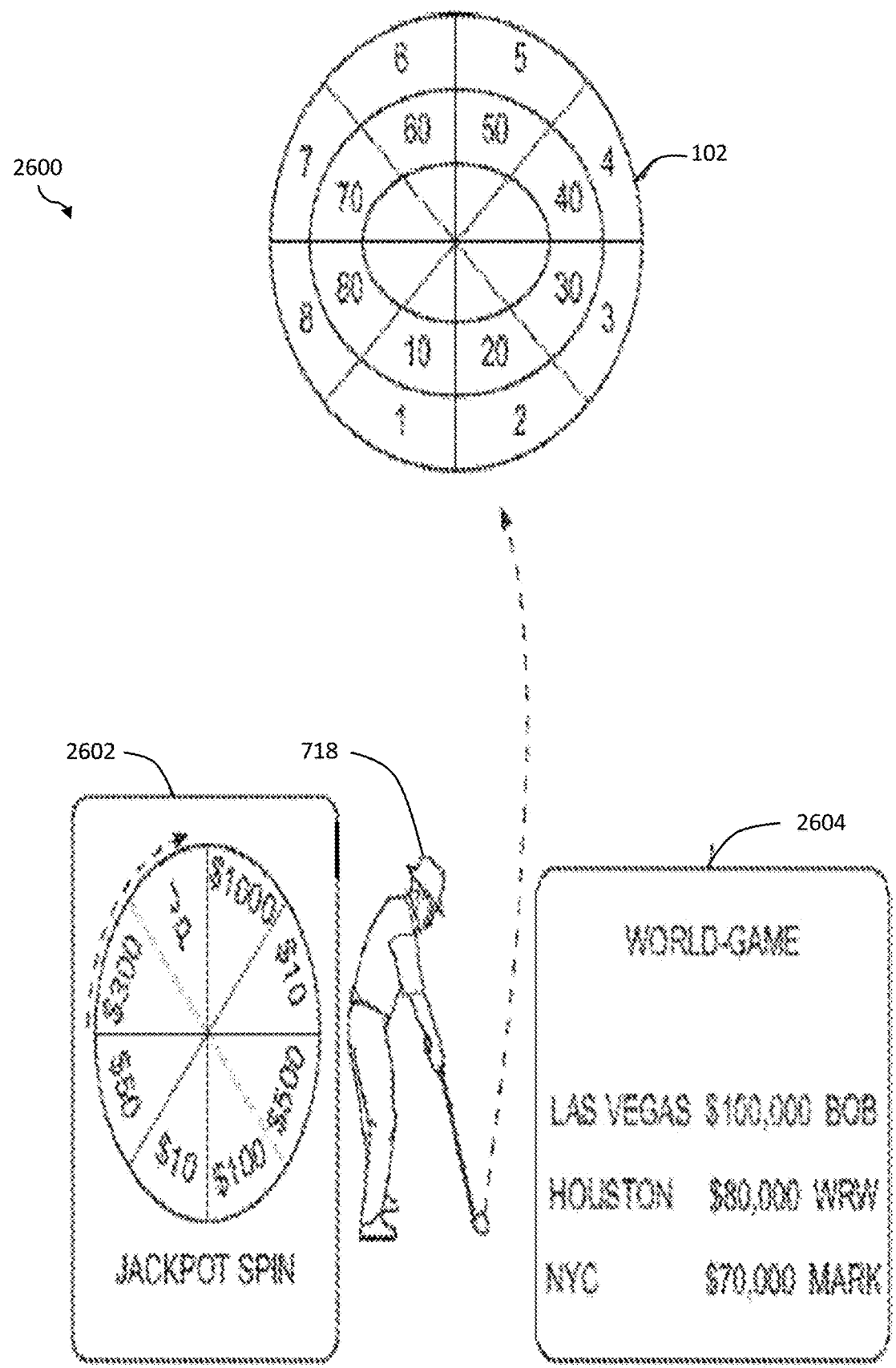
FIG. 26 shows an illustrative world-game.

Referring to FIG. 26 there shown an illustrative world-game 2600. The illustrative world game 2600 includes a hole-in-one prize. Upon hitting a hole-in-one, the player 718 may be awarded a wheel-spin 2602 or other chance-based game representation which provides a randomized chance to win a local and/or a wide-area progressive game, or another, very large prize. A percentage of all World Game revenue may be allocated to growing the prize in real-time, which will be displayed to all participating venues, regardless of where they are located in the world. Displays and currency conversion may be handled by the multi-site progressive controller 428 over the WAN 426. A leader board 2604 is shown on a display indicating large prizes won in the game with the location of win and an optional player identifier. It should be understood that the prize matrix may be changing in real-time so the player 718 does not know where prize values will be when the player 718 strikes the ball. In a further embodiment, prizes may be awarded by strings of consecutive hits. Values of consecutive hits may be added to qualify for prizes. In various embodiments, the largest values result in awards of tiers of progressive jackpot prizes.

Figure 27:
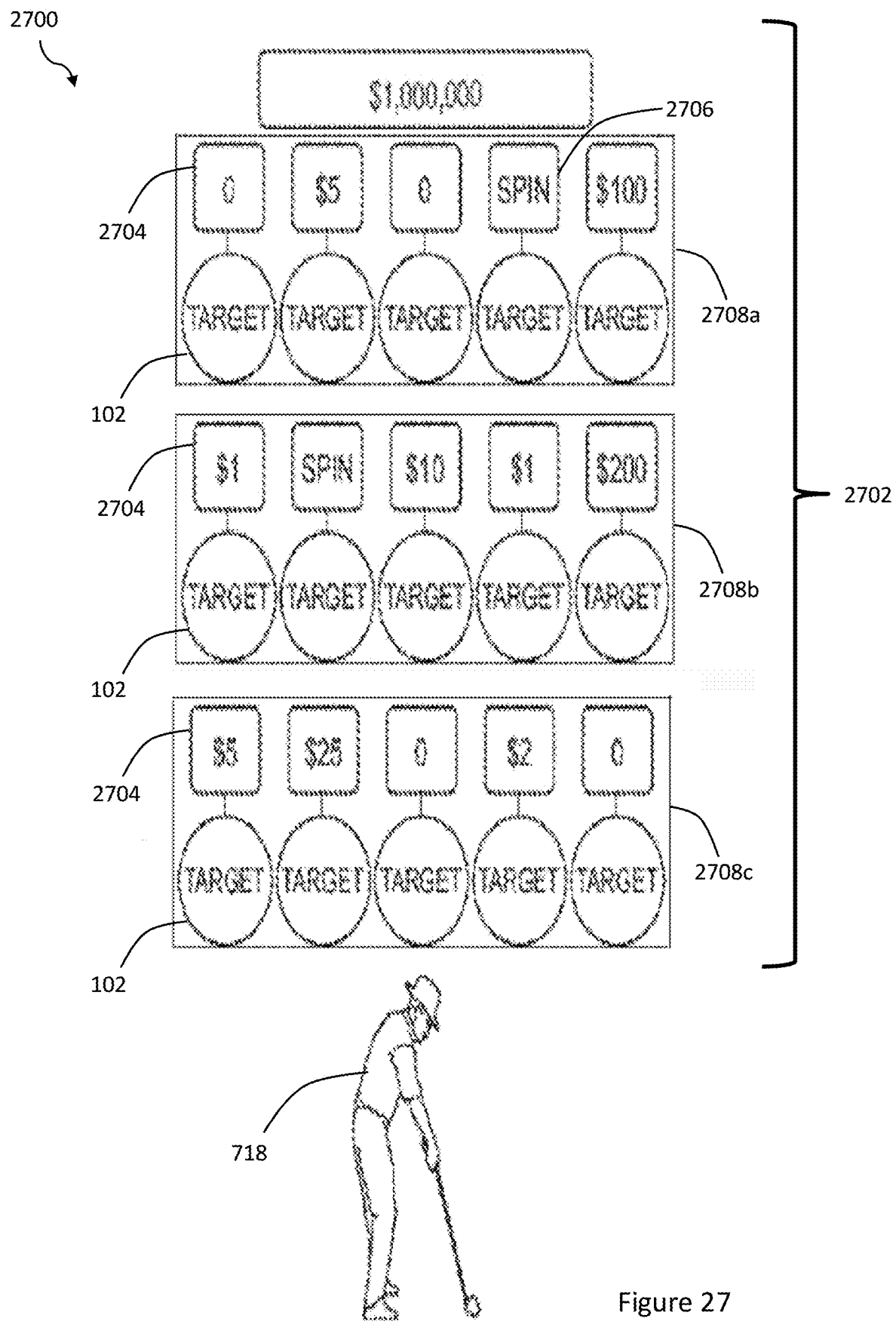
FIG. 27 shows an illustrative matrix game.

Referring now to FIG. 27 there is shown an illustrative matrix game 2700. In this illustrative game, the players 718 hit balls at a matrix of targets or target areas 2702. Each target 102 within the matrix 2702 has a prize value displayed 2704, which is controlled by a computerized controller within or linked to the server 422. Under control of the controller and/or the server 422, the prize matrix 2702 constantly changes in real-time so the player 718 does not know where prize values will be when they strike the ball. When the target matrix 2702 changes, the prize values 2704 on a target 102 change, and target areas 732 may be enabled and disabled. SPIN 2706 indicates a wheel-spin game or other randomized prize award mechanism which provides an opportunity for the player 718 to win a large progressive or non-progressive prize. Other prize values may be fixed award amounts (e.g. $10) or a play of another computer controlled game representation with a variable award.

In one embodiment, the matrix game 2700 is played with matrix 2702 formed from a tiered target having multiple target areas 732, each target area 732 having a display 2704 above the target area 732. Each tier 2708 being divided into several horizontal target areas 732. In various embodiments, the display 2704 is implemented by a projection system. The projection system is controlled by the server 422, which constantly alters the prize value in each target area 732 and reflects that change in the display 2704. In various embodiments, an "X" may be displayed over a target area 732, which indicates that a specific target area 732 is not active for a prize. By controlling the value and frequency of the target values, a player return percentage may be accurately projected.

Figure 28:
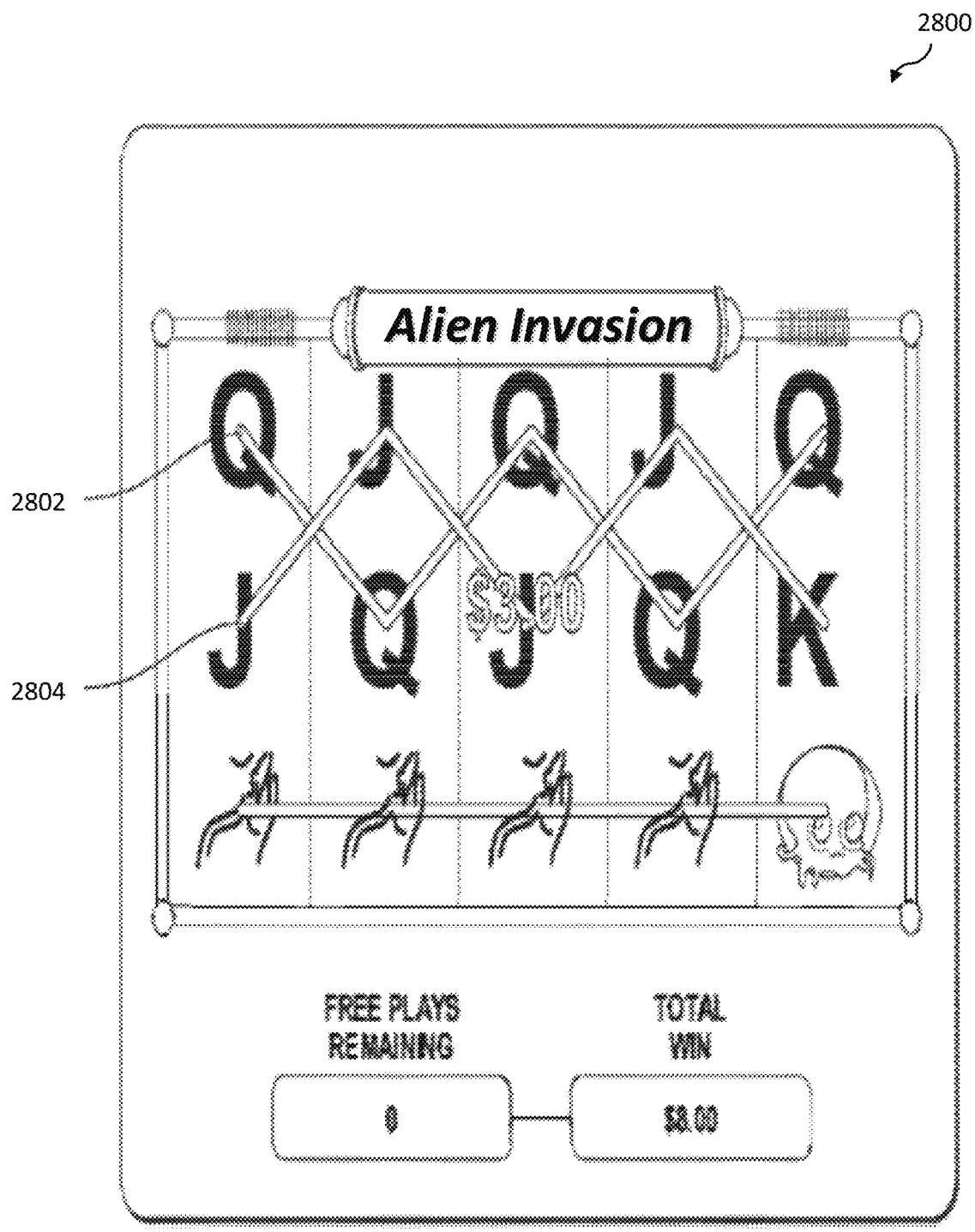
FIG. 28 shows an illustrative example of an entertaining prize display in the form of a Martian slot game.
Figure 29:
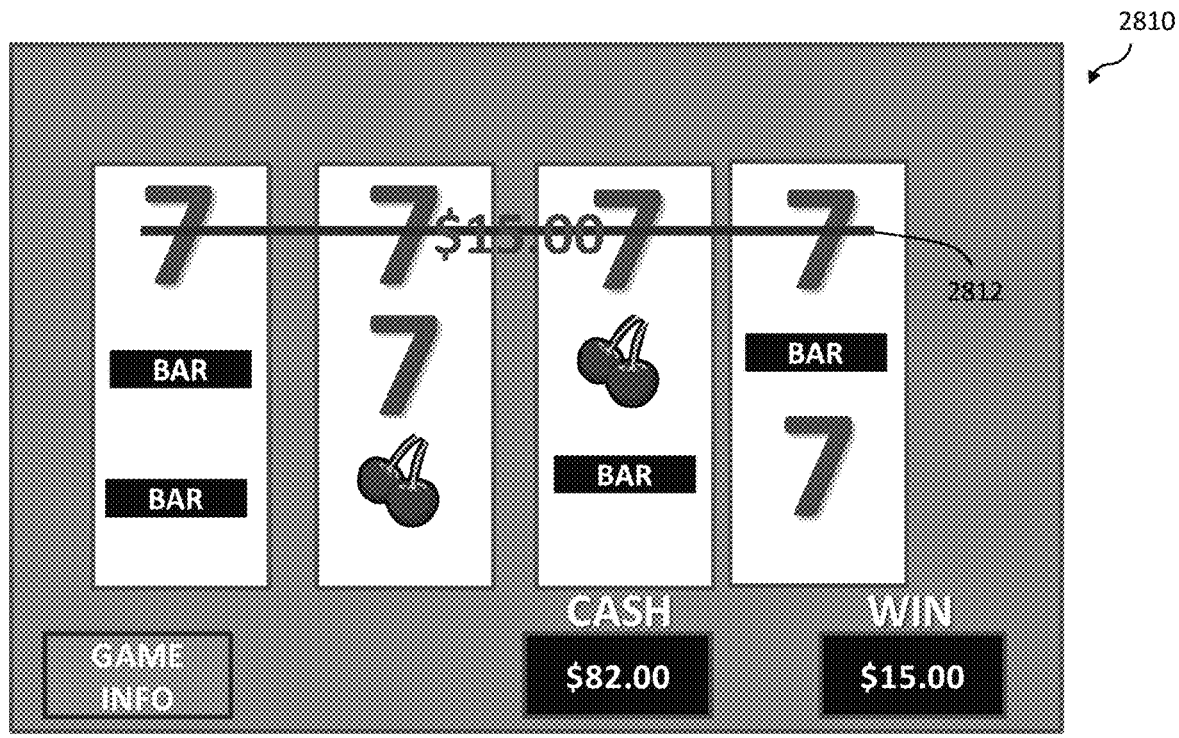
FIG. 29 shows an illustrative example of an entertaining prize display in the form of a Bar 7 slot game.
Figure 30:
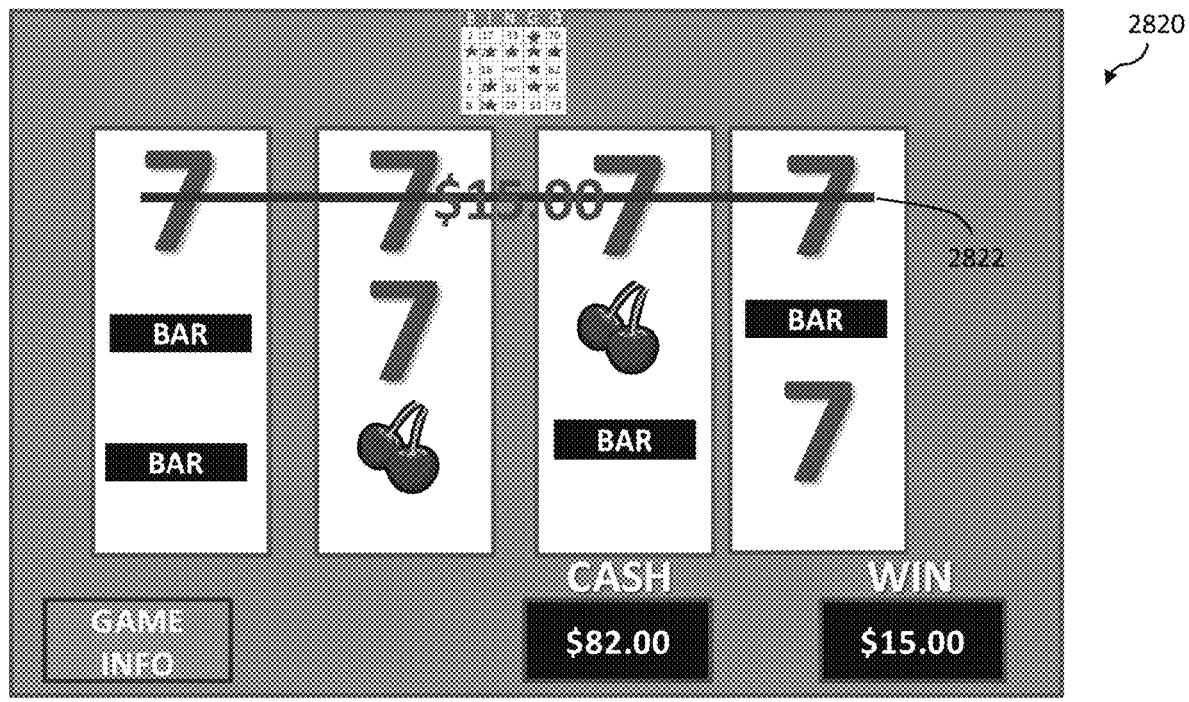
FIG. 30 shows an illustrative example of an entertaining prize display in the form of a Bar 7 bingo slot game.

Referring now to FIG. 28, there is shown an illustrative slot game 2800. One form of a game randomization may be represented as a slot machine, which may be initiated when a player 718 hits a target 102 associated with a particular game theme, or may be one of a set of random games that may be selected by the system or by the player 718. The illustrative slot game 2800 may randomize a game result and derive a payback prize that is a multiple of the wager amount that is specified for the game, and may have been preselected by the player 718. With reference now to FIG. 29, there is shown another embodiment of an illustrative slot game 2810. Referring now to FIG. 30, there is shown an illustrative embodiment of a bingo based slot game 2820 and associated display.

Figure 31:
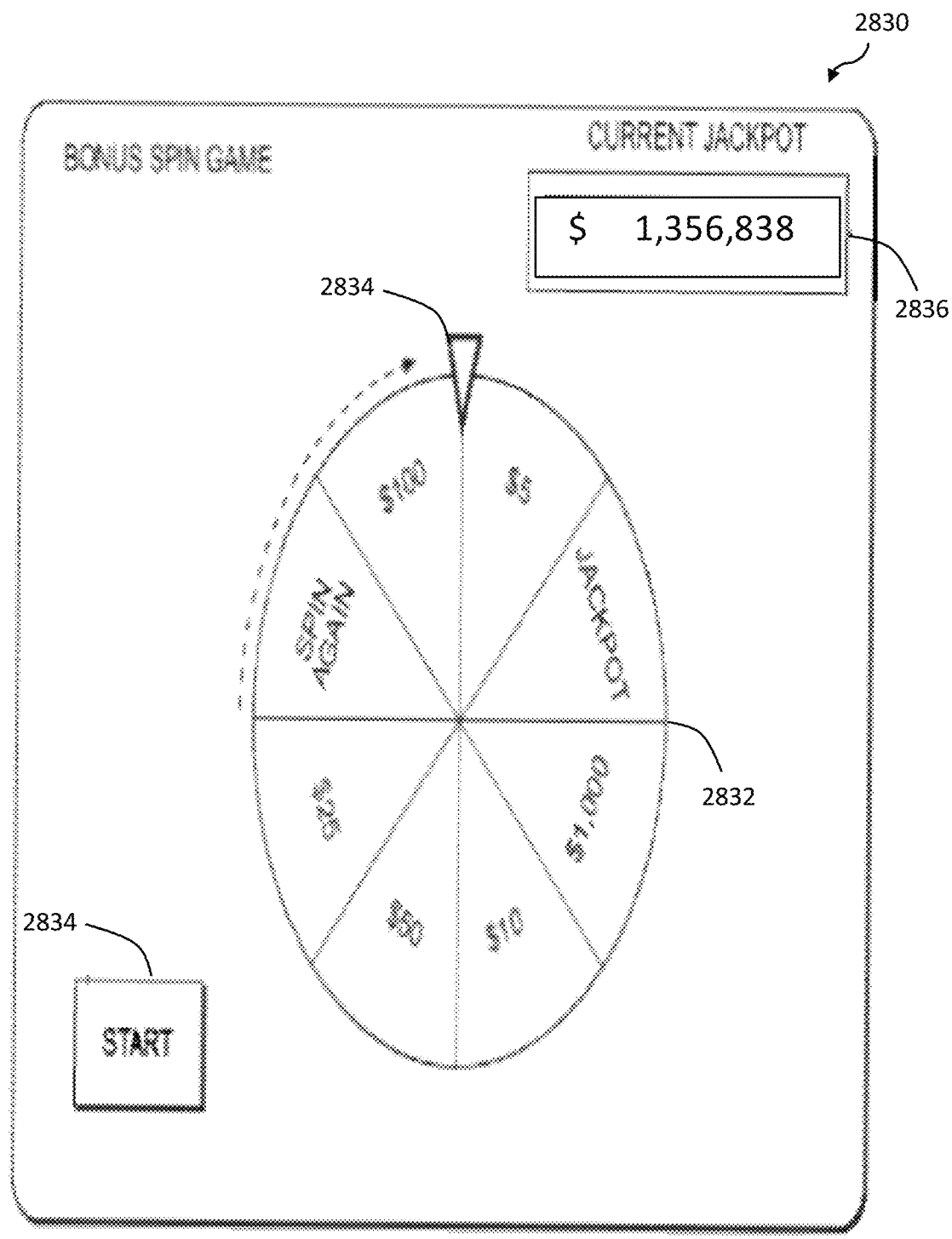
FIG. 31 shows an illustrative embodiment of a progressive bonus spin game display.

Referring to FIG. 31, there is shown an illustrative embodiment of a progressive bonus spin game 2830 and associated display. The bonus spin game 2830 includes a wheel 2832 of prizes, an indicator arrow 2834, a Jackpot indicator 2836, and a start button 2838. Upon completion of the game, the player with the most prizes in a round also gets a percentage of the buy-in of the n players.

Figure 32:
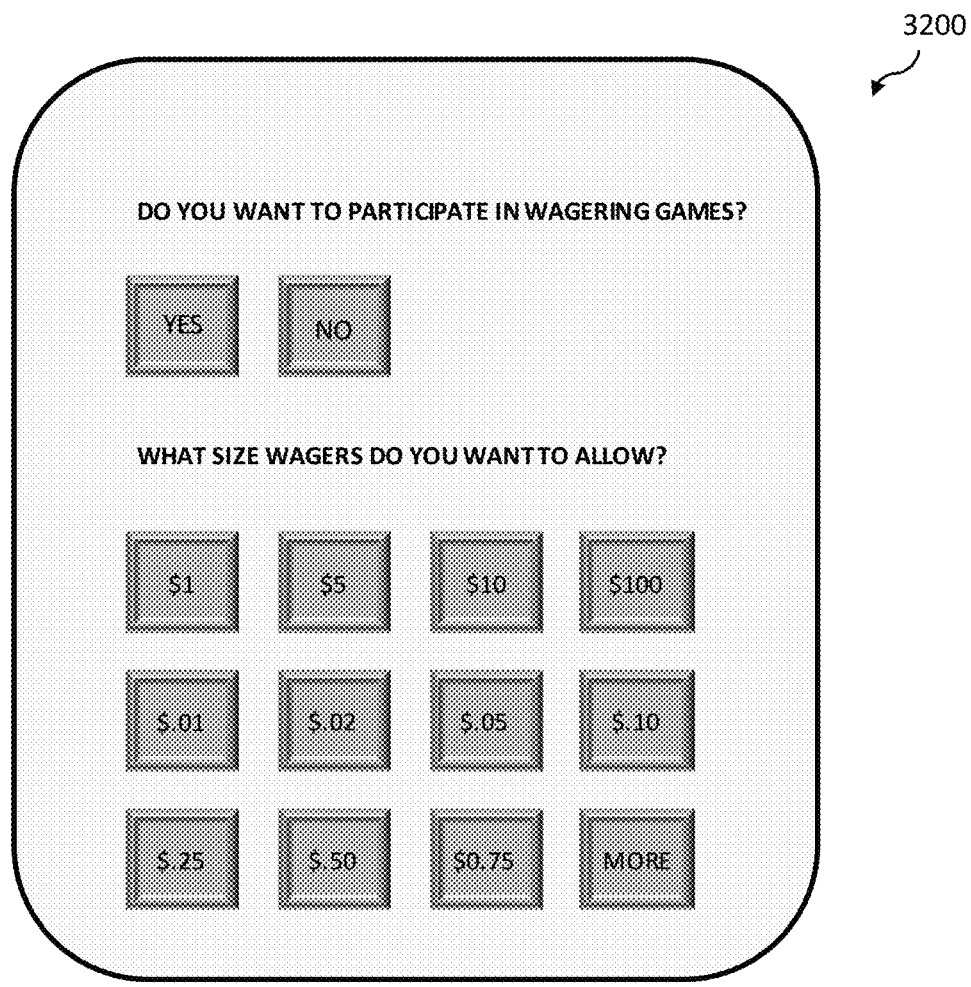
FIG. 32 shows a display screen, including a player prompt and wager selection.

Referring to FIG. 32, there is shown a prompt screen 3200, in which the player may be prompted with questions on display 454 to decide whether to participate in a wagering game and to set the wager level at which the player 718 wishes to participate. This is especially important if the game is of the positive ID type. Additionally, a pay-table such as the one presented below specifies possible prizes, and based on a random selection using the probability of each type of prize as a weight, a prize amount will be chosen which will be the Prize Value multiplied by the wager amount.

| Prize Value | Frequency | Probability | Return |
|---|---|---|---|
| 1,000.00 | 100 | 0.0001000 | 100,000.00 |
| 500.00 | 1000 | 0.0010000 | 500,000.00 |
| 250.00 | 100 | 0.0001000 | 25,000.00 |
| 125.00 | 57 | 0.0000570 | 7,125.00 |
| 75.00 | 999 | 0.0009990 | 74,925.00 |
| 50.00 | 400 | 0.0004000 | 20,000.00 |
| 25.00 | 200 | 0.0002000 | 5,000.00 |
| 15.00 | 1000 | 0.0010000 | 15,000.00 |

-continued

| Prize Value | Frequency | Probability | Return |
|---|---|---|---|
| 10.00 | 1000 | 0.0010000 | 10,000.00 |
| 5.00 | 10000 | 0.0100000 | 50,000.00 |
| 2.00 | 2000 | 0.0020000 | 4,000.00 |
| 1.00 | 103750 | 0.1037500 | 103,750.00 |
| 0.50 | 10000 | 0.0100000 | 5,000.00 |
| 0.20 | 1000 | 0.0010000 | 200.00 |
| 0.00 | 868394 | 0.8683940 | 0.00 |
| | 1000000 | 1.0000000 | 920,000.00 |

| SUMMARY | |
|---|---|
| Sample Size | 1,000,000 |
| Return to player | 920,000.00 |
| % Return to Player | 92.00% |
| Number of Prizes | 131606 |
| Prize Frequency | 13.16% |

An entertaining display will then be presented on display 454 of PIU 414 in hitting bay 412. Display 454 will show a slot-themed game, with entertaining sounds and bonus features such as are well known to those familiar with the art of casino game design. Symbols change on the screen, simulating spinning reels, and stop in a pattern that displays prize values for combinations of symbols in certain lines or other configurations, or, alternatively, in various quantities. An example of such game play is shown in FIG. 28 with a space-themed "Martian-Invasion" game having two winning combinations of symbols: (1) Q-Q-Q-Q-K on pay-line 2802; and (2) J-J-J-J-K on pay-line 2804. A further example of such game play is shown in FIG. 7 with a classic "Bar 7's" game having a winning combination of symbols: 7-7-7-7 on pay-line 2812. Yet a further example of such game play is shown in FIG. 8 with a "Bar 7's Bingo" game having a winning combination of symbols: 7-7-7-7 on pay-line 2822.

Figure 33:
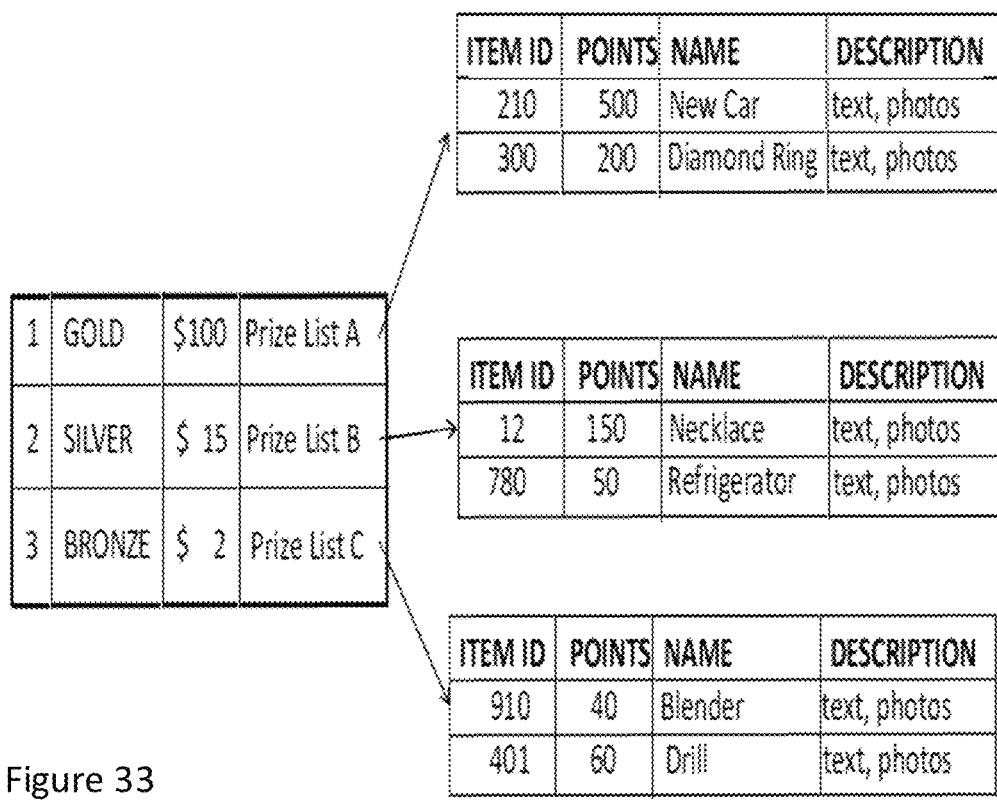
FIG. 33 shows an illustrative multi-tier prize and point redemption system.
Figure 34:
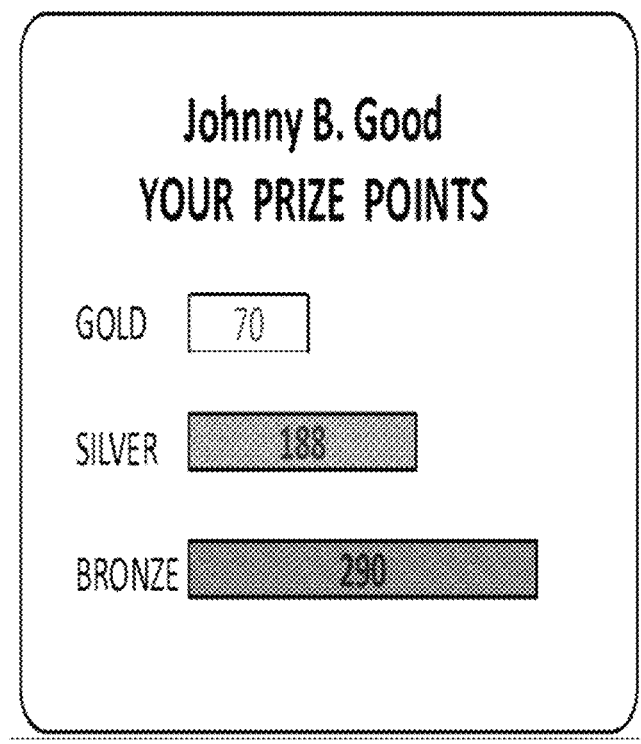
FIG. 34 shows an illustrative player point score presentation.

Referring to FIG. 33 and FIG. 34 there is shown an illustrative multi-tier prize and point redemption system. Mechanisms are common to award tokens or points to consumers for participating in certain endeavors. Examples include redemption systems as diverse as skee-ball tickets and frequent-flyer points. In one case the points are awarded as prize elements, in the other, they are awarded for purchasing products. There are many other examples in various programs instituted to promote consumer loyalty to a particular type of activity, brand or association. Typically these programs award points, credits, or tokens which have a uniform definable value. Based on the awarded value, a number of points can be accumulated to redeem or purchase some service or merchandise.

In some embodiments, the skill portion of a game session may have multiple steps, requiring multiple ball hits successfully landing in one or more targets. The game might involve the generation of a numeric value, and several play events result in the sum of numeric values and a final prize value may be dependent on the sum of those numbers.

In another embodiment, a game includes a random process that is a mechanical process rather than an electronic process. In a further embodiment, only one ball can be routed through the mechanical evaluation process at a time. An example of such a process would be analogous in principle to a "pachinko" machine described above, in which a golf ball enters a target 102 and falls into a space that allows 2-dimensional movement where the motion of the golf ball is affected by a series of obstacles such as barriers or posts that result in eventually dropping the ball into one of N areas, each associated with a particular prize value as shown above. Optical or equivalent detection mechanisms are associated with each prize area so that the server 422 is informed of the prize value, and communicated so that it can be displayed on the PIU 414 and/or other displays in the golf gaming facility.

Another illustrative embodiment combines a skill element with a game of chance in a gambling game. The skill element may be used to increase or modify the probability of winning prizes in the game of chance. One example is a game in which golf balls are aimed at a group of targets 102. Upon successfully hitting a target 102, a computerized game is initiated which has various prize levels. More difficult targets may offer a higher probability of winning the jackpot, a higher prize value, a higher overall prize return percentage to players and/or different wager amounts for play.

In various embodiments, successfully hitting a target 102 initiates computerized play of a slot game, which is displayed to the player 718. In this example, the game is modified so that a different prize structure is available to the player, depending on which target 102 or target area 732 is hit. For example, the prize structure may be as follows:

Target 1—Top prize $10,000; percentage return to player is 98%
Target 2—Top prize $5,000; percentage return to player is 95%
Target 3—Top prize $2,000; percentage return to player is 90%
Target 4—Top prize $1,000; percentage return to player is 85%
Target 5—Top prize $500; percentage return to player is 80%

In another example, the probability of hitting a prize, including a progressive prize, can be increased. This increase may be presented in many visual varieties to the player in the presentation of the computerized slot game. In one embodiment, the slot game may include a multi-reel game where a jackpot is won by lining up 5 jackpot symbols. The increased probability may be presented by starting the game play by having some of the reels pre-set with a jackpot symbol and only spinning the rest of the reels. If the game were a 5 reel game, 2 reels could be set to display the jackpot symbol and only the other 3 would have a simulated spin.

In a positive-ID based embodiment, hits on different target tiers may also initiate different wager amounts, providing more flexibility to a game designer or operator. In one example of such a positive-ID based embodiment, the hardest prize to hit may award a very high jackpot, but require a high wager cost as well.

Yet another embodiment of the golf wagering system 400 combines a skill element with a game of chance in a gambling game. The particular odds and format of the game are tailored for a particular player 718. The particular player may be identified through facial recognition, a player ID card, or other means. In this embodiment, the game tracks play of the particular player 718 and adjusts future prize structures or payout percentages based on past play. For example, adjustments can be on a per-day, per-play, or other measure based on changing player capabilities over time. This information can also be used to categorize players under a skill level matrix, combined with other player attributes or identifiers, so that the players might be eligible for awards, promotions, prizes or other incentives.

One technique to enhance the interest of randomized prize golf games where payment is made on striking a golf ball without requiring a target hit is to award certain prizes even when targets are missed. An algorithm may be applied that heuristically measures the incidence of target hits to misses and may introduce random small prize games when the ratio is very low. This can be done to bring the payout up to a minimum threshold level. This may keep less skilled golfers from becoming discouraged and will encourage more players to participate.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the subject matter disclosed is determined by the following claims and their legal equivalents.

What is claimed is:

1. A ball identification error analysis system comprising:
   a plurality of balls, each ball including a unique ID indicator;
   a plurality of bays, each bay including a ball dispenser, a first ball ID reader, and a ball tracking subsystem, each bay communicatively coupled to a tracking module, the ball tracking subsystem determining a flight path of a ball, the flight path corresponding to a plurality of probabilities, each of the plurality of probabilities corresponding to a probability that the ball will strike a particular target;
   a plurality of targets, each target including a ball detector and a second ball ID reader, each ball detector communicatively coupled to the tracking module, each second ball ID reader communicatively coupled to the tracking module;
   wherein the tracking module is configured to retrieve a list of all balls hit during a time period when one of the plurality of targets detects a ball and the one target of the plurality of targets does not read the ID indicator of the ball;
   wherein the list of balls hit during the time period that have not been read by any one of the second ball ID readers includes more than one ball, the tracking module is further configured to determine a list of balls having a first probability of arriving at the one target from the list of balls hit during the time period that have not been read by any one of the second ball ID readers, and the tracking is module further configured to determine a list of balls having a second probability of arriving at the one target from the list of balls hit during the time period that have not been read by any one of the second ball ID readers, the second probability different than the first probability; and
   wherein the greater of the first probability and the second probability is associated with hitting the target.

2. The ball identification error analysis system of claim 1 wherein the ball identification error analysis system awards a target strike to all balls in the list of balls having a first probability of arriving at the one target.

3. The ball identification error analysis system of claim 1 wherein the ball identification error analysis system flags all balls in the list of balls having a first probability of arriving at the one target for special handling.

4. The ball identification error analysis system of claim 1 wherein the unique ID indicator is an RFID and each second ball ID reader is an RFID reader.

5. The ball identification error analysis system of claim 1 wherein the ball tracking subsystem includes Doppler radar.

6. The ball identification error analysis system of claim 1 wherein the ball tracking subsystem includes laser distance determination.

7. The ball identification error analysis system of claim 1 wherein the ball tracking subsystem includes at least one camera.

8. The ball identification error analysis system of claim 1 wherein the ball tracking subsystem includes at least one sensor frame.

9. The ball identification error analysis system of claim 1 wherein the tracking module includes a database, the database including characteristics of each ball struck from each of a plurality of hitting bays, the plurality of hitting bays including the hitting bay.

10. A ball identification error analysis system comprising:
- a plurality of balls, each ball including a unique ID indicator;
- a plurality of bays, each bay including a ball dispenser, a first ball ID reader, and a ball tracking subsystem, each bay communicatively coupled to a tracking module, the ball tracking subsystem determining at least one parameter describing a flight path of a ball, the flight path corresponding to a plurality of probabilities, each of the plurality of probabilities corresponding to a probability that the ball will strike a particular target;
- a plurality of targets, each target including a ball detector and a second ball ID reader, each ball detector communicatively coupled to the tracking module, each second ball ID reader communicatively coupled to the tracking module;
- a list of balls that hit at least one of the plurality of targets, wherein the list of balls is associated with a predefined time period and the list of balls includes the unique ID indicator for each ball;
- wherein the tracking module is configured to retrieve the list of all balls hit during a predefined time period when one of the plurality of targets identifies that a detected ball has entered a target and a second ball ID reader associated with the target is unable to read the ID indicator associated with the detected ball;
- wherein the list of balls hit during the predefined time period is compared to a list of balls read by one of the targets;
- wherein a detected ball has not been read by one of the second ball ID readers;
- wherein the detected ball is associated with a unique ID indicator that has not been associated with another ball in the list of balls that hit at least one of the targets.

11. The ball identification error analysis system of claim 10 wherein the unique ID indicator is an RFID and each ball reader of the plurality of ball readers is an RFID reader.

12. The ball identification error analysis system of claim 10 wherein the ball tracking subsystem includes Doppler radar.

13. The ball identification error analysis system of claim 10 wherein the ball tracking subsystem includes laser distance determination.

14. The ball identification error analysis system of claim 10 wherein the ball tracking subsystem includes at least one camera.

15. The ball identification error analysis system of claim 10 wherein the tracking module includes a database, the database including characteristics of each ball struck from each of a plurality of hitting bays, the plurality of hitting bays including the hitting bay.

16. A ball identification error analysis system comprising:
- a plurality of balls, each ball including a unique ID indicator;
- a plurality of bays, each bay including a ball dispenser, a first ball ID reader, and a ball tracking subsystem, each bay communicatively coupled to a tracking module, the ball tracking subsystem determining at least one parameter describing a flight path of a ball, the flight path corresponding to a plurality of probabilities;
- wherein each of the plurality of probabilities correspond to a probability that the ball strikes a particular target;
- a plurality of targets, each target including a ball detector and a second ball ID reader, each ball detector communicatively coupled to the tracking module, each second ball ID reader communicatively coupled to the tracking module;
- wherein the tracking module is configured to retrieve a list of all balls hit during a predefined time period when one of the plurality of targets identifies a detected ball that has entered a target and a second ball ID reader associated with the target is unable to read the ID indicator of the detected ball;
- wherein a ranked list of balls is calculated, in which each ball has an associated probability of hitting the target, and enabling a determination that associates the detected ball with a most likely ball to enter the target.

17. The ball identification error analysis system of claim 16 wherein the unique ID indicator is an RFID and each ball reader of the plurality of ball readers is an RFID reader.

18. The ball identification error analysis system of claim 16 wherein the ball tracking subsystem includes Doppler radar.

19. The ball identification error analysis system of claim 16 wherein the ball tracking subsystem includes laser distance determination.

20. The ball identification error analysis system of claim 16 wherein the ball tracking subsystem includes at least one camera.

21. The ball identification error analysis system of claim 16 wherein the tracking module includes a database, the database including characteristics of each ball struck from each of a plurality of hitting bays, the plurality of hitting bays including the hitting bay.

22. A ball identification error analysis system comprising:
- a plurality of balls, each ball including a unique ID indicator;
- a plurality of bays, each bay including a ball dispenser, a first ball ID reader, and a ball tracking subsystem, each bay communicatively coupled to a tracking module, the ball tracking subsystem determining at least one parameter corresponding to a flight path of a ball, in which the flight path is associated with a plurality of probabilities, each of the plurality of probabilities corresponding to a probability that a ball strikes a particular target;
- wherein each of the plurality of probabilities of the ball hitting a given target is recalculated periodically based upon a history of ball hits and a history of targets hit.

23. The ball identification error analysis system of claim 22 wherein the unique ID indicator is an RFID and each ball reader of the plurality of ball readers is an RFID reader.

24. The ball identification error analysis system of claim 22 wherein the ball tracking subsystem includes Doppler radar.

25. The ball identification error analysis system of claim 22 wherein the ball tracking subsystem includes laser distance determination.

26. The ball identification error analysis system of claim 22 wherein the ball tracking subsystem includes at least one camera.

27. The ball identification error analysis system of claim 22 wherein the tracking module includes a database, the database including characteristics of each ball struck from each of a plurality of hitting bays, the plurality of hitting bays including the hitting bay.

* * * * *